United States Patent
Yoeda

(10) Patent No.: US 10,280,853 B2
(45) Date of Patent: May 7, 2019

(54) SUPERCHARGED INTERNAL COMBUSTION ENGINE

(71) Applicant: TOYOTA JIDOSHA KABUSHIKI KAISHA, Toyota-shi, Aichi-ken (JP)

(72) Inventor: Keiji Yoeda, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 203 days.

(21) Appl. No.: 15/305,533

(22) PCT Filed: Jun. 1, 2015

(86) PCT No.: PCT/JP2015/002765
§ 371 (c)(1),
(2) Date: Oct. 20, 2016

(87) PCT Pub. No.: WO2015/194104
PCT Pub. Date: Dec. 23, 2015

(65) Prior Publication Data
US 2017/0089279 A1    Mar. 30, 2017

(30) Foreign Application Priority Data
Jun. 19, 2014  (JP) .................. 2014-126320
Apr. 30, 2015  (JP) .................. 2015-093342

(51) Int. Cl.
*F02M 26/06* (2016.01)
*F02D 41/00* (2006.01)
(Continued)

(52) U.S. Cl.
CPC .......... *F02D 41/0077* (2013.01); *F02B 33/40* (2013.01); *F02D 41/005* (2013.01);
(Continued)

(58) Field of Classification Search
CPC ............. F02D 41/0077; F02D 41/0007; F02D 41/005; F02D 41/0065; F02D 41/064;
(Continued)

(56) References Cited

U.S. PATENT DOCUMENTS

| 7,281,378 B2 * | 10/2007 | Gu ........................ F02M 26/05 60/605.2 |
| 8,069,663 B2 * | 12/2011 | Ulrey .................... F02M 26/05 60/605.2 |

(Continued)

FOREIGN PATENT DOCUMENTS

| GB | 2 386 701 A | 9/2003 |
| JP | 2002-155753 A | 5/2002 |

(Continued)

*Primary Examiner* — Thai Ba Trieu
(74) *Attorney, Agent, or Firm* — Sughrue Mion, PLLC

(57) ABSTRACT

A supercharged internal combustion engine is provided that is capable of introducing EGR gas into an intake passage on an upstream side relative to a compressor. When a required WGV opening degree is less than a lower limit value WGVmin in a case in which introduction of EGR gas is started under a situation in which the temperature of an EGR valve is less than or equal to a predetermined value X1, the WGV opening degree is controlled during a protection time period T3 after introduction of EGR gas starts by using the lower limit value WGVmin as the required WGV opening degree.

15 Claims, 15 Drawing Sheets

(51) Int. Cl.
*F02D 41/06* (2006.01)
*F02M 26/47* (2016.01)
*F02B 33/40* (2006.01)
*F02D 41/14* (2006.01)
*F02M 35/10* (2006.01)
*F02B 39/16* (2006.01)

(52) U.S. Cl.
CPC ..... *F02D 41/0007* (2013.01); *F02D 41/0065* (2013.01); *F02D 41/064* (2013.01); *F02D 41/1444* (2013.01); *F02M 26/06* (2016.02); *F02M 26/47* (2016.02); *F02M 35/10157* (2013.01); *F02M 35/10222* (2013.01); *F02B 2039/168* (2013.01); *F02D 2041/0067* (2013.01); *F02D 2041/1472* (2013.01); *F02D 2200/021* (2013.01); *F02D 2200/0414* (2013.01); *Y02T 10/144* (2013.01); *Y02T 10/47* (2013.01)

(58) Field of Classification Search
CPC ......... F02D 41/1444; F02D 2200/0414; F02D 2041/0067; F02D 2041/1472; F02D 2200/021; F02M 35/10222; F02M 26/06; F02M 26/47; F02M 35/10157; F02B 33/40; F02B 2039/168; Y02T 10/144; Y02T 10/47
USPC .......................................... 60/605.2; 701/108
See application file for complete search history.

(56) References Cited

U.S. PATENT DOCUMENTS

| | | | | |
|---|---|---|---|---|
| 8,161,746 | B2* | 4/2012 | Ulrey | F02M 26/06 |
| | | | | 60/605.2 |
| 8,522,756 | B2* | 9/2013 | Vuk | F02M 26/08 |
| | | | | 701/108 |
| 8,739,527 | B2* | 6/2014 | Ulrey | F02M 26/44 |
| | | | | 60/605.2 |
| 2007/0283696 | A1 | 12/2007 | Lyons | |
| 2012/0090584 | A1 | 4/2012 | Jung | |
| 2012/0271529 | A1* | 10/2012 | Kashiwagi | F02B 37/12 |
| | | | | 701/102 |
| 2013/0019848 | A1* | 1/2013 | Noguchi | F02M 26/39 |
| | | | | 123/568.12 |
| 2014/0305412 | A1* | 10/2014 | Ahrns | F02D 41/0007 |
| | | | | 123/568.21 |
| 2015/0198119 | A1* | 7/2015 | Kuske | F02M 26/06 |
| | | | | 60/605.2 |
| 2017/0030305 | A1* | 2/2017 | Sugiyama | F02M 26/06 |
| 2017/0259807 | A1* | 9/2017 | Naidu | F02D 41/0007 |

FOREIGN PATENT DOCUMENTS

| | | |
|---|---|---|
| JP | 2002-256915 A | 9/2002 |
| JP | 2012-87779 A | 5/2012 |
| JP | 2015-175330 A | 10/2015 |
| WO | 2015/141149 A1 | 9/2015 |

* cited by examiner

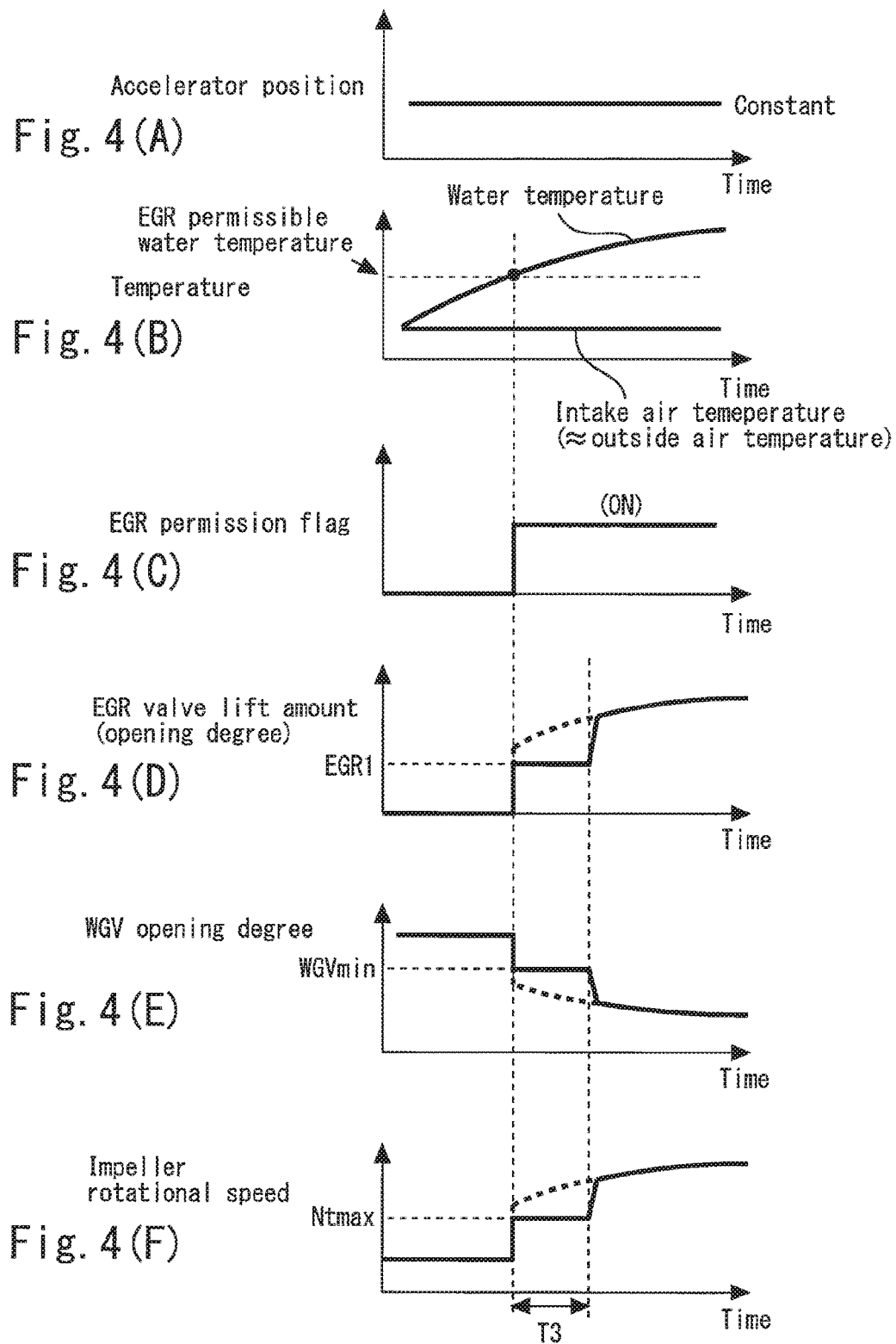

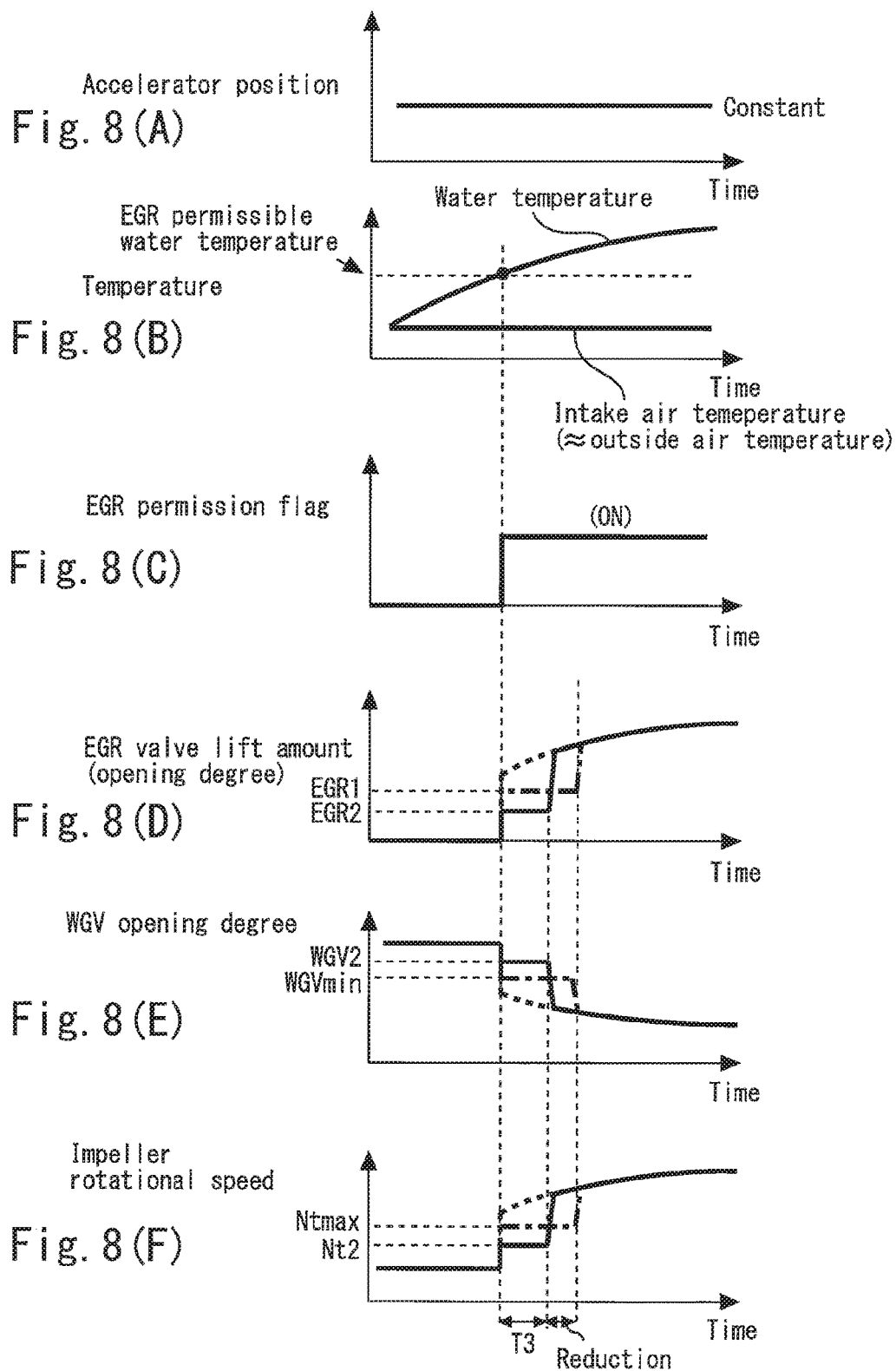

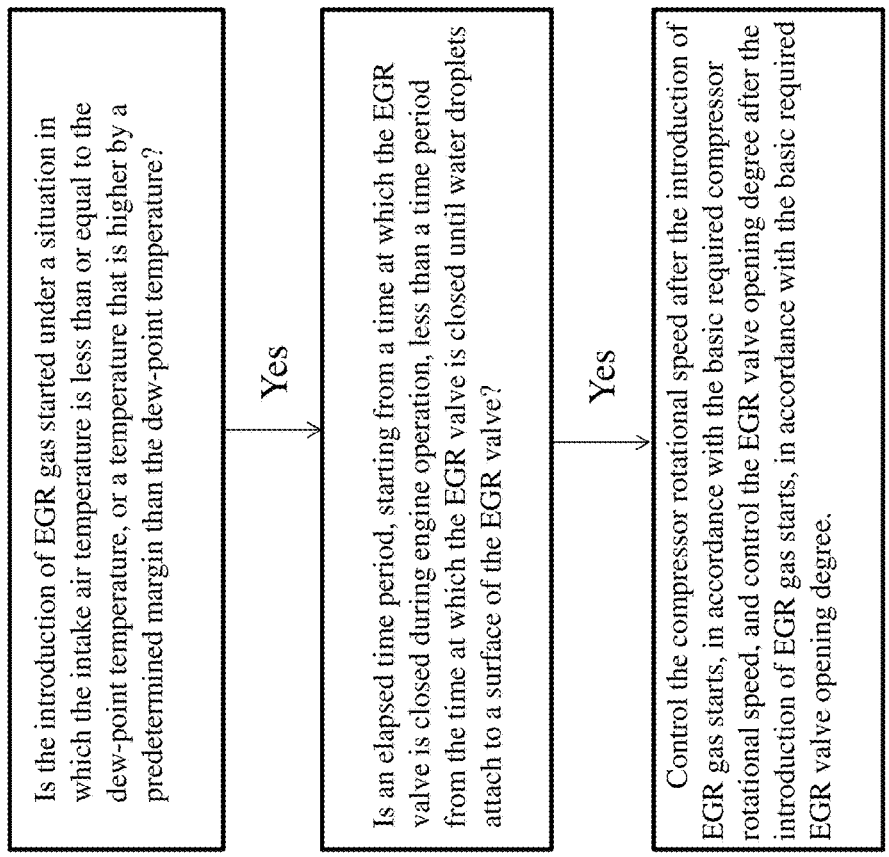

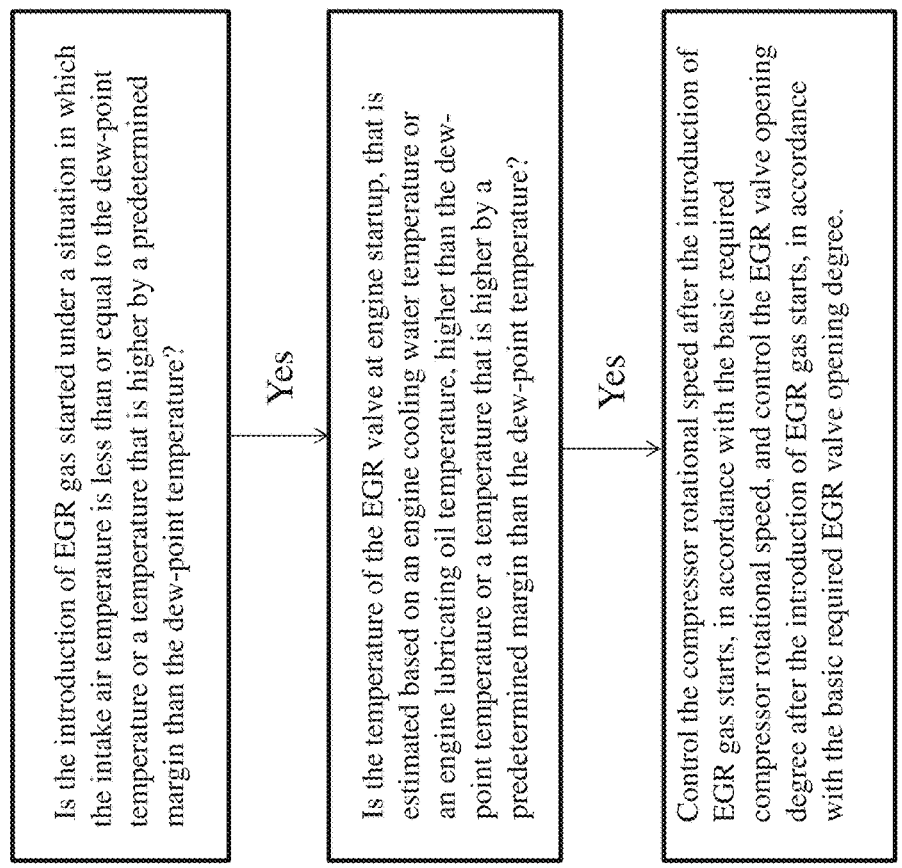

SUPERCHARGED INTERNAL COMBUSTION ENGINE

CROSS REFERENCE TO RELATED APPLICATIONS

This application is a National Stage of International application No. PCT/JP2015/002765 filed Jun. 1, 2015, claiming priority based on Japanese Patent Application No. 2014-126320 filed Jun. 19, 2014 and 2015-093342 filed Apr. 30, 2015, the contents of all of which are incorporated herein by reference in their entirety.

TECHNICAL FIELD

The present invention relates to a supercharged internal combustion engine, and more particularly to a supercharged internal combustion engine that is capable of introducing EGR gas into an intake passage on an upstream side relative to a compressor that supercharges intake air.

BACKGROUND ART

A supercharged internal combustion engine has already been disclosed in, for example, PTL 1. The aforementioned internal combustion engine includes an intercooler that cools supercharged intake air, and an EGR cooler that cools EGR gas that is introduced into an intake passage on an upstream side relative to a compressor. The EGR gas amount is controlled so that condensed water is not generated in the intercooler and the EGR cooler.

If introduction of EGR gas is performed during an initial warm-up stage after commencing startup from a cold state, condensed water is liable to be generated. Consequently, an EGR valve is normally closed during an initial warm-up stage. However, even if the EGR valve is in a closed state, exhaust gas is present in the EGR passage on an upstream side of the EGR gas flow relative to the EGR valve. Therefore, in some cases, as a result of moisture contained in exhaust gas touching against the cold EGR valve, condensation of moisture occurs on the surface of the EGR valve on the side that is exposed to the exhaust gas and condensed water is generated.

In order to suppress the occurrence of condensed water that is generated in the above described manner, it is conceivable to adopt a measure so as to heat the wall surface of the flow passage of EGR gas on an upstream side relative to the compressor. However, since the state is one in which the EGR valve that is being closed is sandwiched between low-temperature fresh air and the exhaust gas, it is difficult to directly heat the EGR valve itself and keep the EGR valve warm. Consequently, when the engine cooling water temperature rises after cold starting and a condition is established that allows the introduction of EGR gas, the state at such time is one in which condensed water is attached to the EGR valve surface on a side which the exhaust gas contacts against. Further, even at a time other than when warming up the engine, condensed water sometimes attaches to the surface of the EGR valve if the EGR valve that is in a closed state during engine operation is cooled by low-temperature intake air.

If the EGR valve is opened to introduce EGR gas without giving particular consideration to the generation of condensed water at the EGR valve as described above, condensed water that has attached to the EGR valve will flow into the intake passage. If condensed water that flowed into the intake passage is drawn into the compressor, there is a concern that droplets of the condensed water will collide against the impeller of the compressor and lead to the occurrence of an erosion phenomenon at the impeller.

CITATION LIST

Patent Literature

PTL 1: Japanese Patent Laid-Open No. 2012-087779

SUMMARY OF INVENTION

The present invention has been conceived to address the above described problem, and an object of the present invention is to provide a supercharged internal combustion engine that, without requiring a particular addition or change to the hardware configuration, is capable of suppressing the occurrence of an erosion phenomenon due to the fact that condensed water that is generated on the surface of an EGR valve flows into a compressor when the EGR valve is opened.

A first aspect of the present invention is a supercharged internal combustion engine. The supercharged internal combustion engine includes: a compressor configured to supercharge intake air, an EGR passage connecting an intake passage on an upstream side relative to the compressor with an exhaust passage; an EGR valve provided in the EGR passage and regulating an amount of an EGR gas that flows through the EGR passage; and compressor control means for controlling a compressor rotational speed in accordance with a basic required compressor rotational speed that is determined based on an engine speed and an engine load parameter. When introduction of EGR gas is started in a case where the basic required compressor rotational speed is higher than a predetermined rotational speed, the compressor control means restricts the compressor rotational speed after introduction of EGR gas starts so that the compressor rotational speed becomes less than or equal to the predetermined rotational speed.

Further, according to a second aspect of the present invention, in the first aspect, when introduction of EGR gas is started for a first time after cold starting of the internal combustion engine in a case where the basic required compressor rotational speed is higher than the predetermined rotational speed, the compressor control means may implement the restriction of the compressor rotational speed.

Further, according to a third aspect of the present invention, in the first aspect, when introduction of EGR gas is started under a situation in which a temperature of the EGR valve is less than or equal to a dew-point temperature of exhaust gas that is present in the EGR passage while the EGR valve is closed or a temperature that is higher than the dew-point temperature by a predetermined margin in a case in which the basic required compressor rotational speed is higher than the predetermined rotational speed, the compressor control means implements the restriction of the compressor rotational speed.

Further, according to a fourth aspect of the present invention, in the third aspect, the compressor control means may restrict the compressor rotational speed after introduction of EGR gas starts until a time period, which is a sum of a time period from a time point at which the EGR valve opens until a time point at which water droplets start to detach from the EGR valve and a time period from the time point at which water droplets start to detach from the EGR valve until a time point at which water droplets finish arriving at an inlet of the compressor, passes.

Further, according to a fifth aspect of the present invention, in the third or fourth aspect, the supercharged internal combustion engine may be a spark-ignition internal combustion engine, which includes EGR valve control means for controlling an EGR valve opening degree in accordance with a basic required EGR valve opening degree that is in accordance with an engine operating condition. The basic required compressor rotational speed may be determined based on the basic required EGR valve opening degree in addition to the engine speed and the engine load parameter. The EGR valve control means may control the EGR valve opening degree at a time that restriction of the compressor rotational speed is performed by the compressor control means after introduction of EGR gas starts, in accordance with a first required EGR valve opening degree that is less than the basic required EGR valve opening degree. The first required EGR valve opening degree may be an EGR valve opening degree corresponding to an EGR gas amount that is capable of being introduced under a supercharging pressure that is obtained under a situation in which the compressor rotational speed is set to a compressor rotational speed that is less than or equal to the predetermined rotational speed and that is an EGR gas amount that is capable of being introduced while suppressing a change in an intake air amount between before and after opening of the EGR valve.

Further, according to a sixth aspect of the present invention, in the third or fourth aspect, the supercharged internal combustion engine may be a spark-ignition internal combustion engine, which includes EGR valve control means for controlling an EGR valve opening degree in accordance with a basic required EGR valve opening degree that is in accordance with an engine operating condition. The basic required compressor rotational speed may be determined based on the basic required EGR valve opening degree in addition to the engine speed and the engine load parameter. The EGR valve control means may control the EGR valve opening degree at a time that restriction of the compressor rotational speed is performed by the compressor control means after introduction of EGR gas starts, in accordance with a second required EGR valve opening degree that is less than an EGR valve opening degree corresponding to an EGR gas amount that is capable of being introduced under a supercharging pressure that is obtained under a situation in which the compressor rotational speed is set to the predetermined rotational speed. The compressor control means may restrict the compressor rotational speed after introduction of EGR gas starts, in accordance with a first required compressor rotational speed that is capable of suppressing a change in an intake air amount between before and after opening of the EGR valve when using the second required EGR valve opening degree.

Further, according to a seventh aspect of the present invention, in the fifth or sixth aspect, when an intake air temperature is less than or equal to the dew-point temperature or a temperature that is higher by a predetermined margin than the dew-point temperature, the compressor control means may determine that the temperature of the EGR valve is less than or equal to the dew-point temperature or a temperature that is higher by a predetermined margin than the dew-point temperature.

Further, according to an eighth aspect of the present invention, in the seventh aspect, even when a first case applies in which introduction of EGR gas is started under a situation in which the intake air temperature is less than or equal to the dew-point temperature or a temperature that is higher by a predetermined margin than the dew-point temperature, in a second case in which an elapsed time period from a time at which the EGR valve is closed during engine operation is less than a time period from the time at which the EGR valve is closed until water droplets attach to a surface of the EGR valve, the compressor control means may control the compressor rotational speed after introduction of EGR gas starts, in accordance with the basic required compressor rotational speed. Even when the first case applies, in the second case the EGR valve control means may control the EGR valve opening degree after introduction of EGR gas starts, in accordance with the basic required EGR valve opening degree.

Further, according to a ninth aspect of the present invention, in the seventh aspect, even when a first case applies in which introduction of EGR gas is started under a situation in which the intake air temperature is less than or equal to the dew-point temperature or a temperature that is higher by a predetermined margin than the dew-point temperature, in a third case in which the temperature of the EGR valve at engine startup that is estimated based on an engine cooling water temperature or an engine lubricating oil temperature is higher than the dew-point temperature or a temperature that is higher by a predetermined margin than the dew-point temperature, the compressor control means may control the compressor rotational speed after introduction of EGR gas starts, in accordance with the basic required compressor rotational speed. Even when the first case applies, in the third case the EGR valve control means may control the EGR valve opening degree after introduction of EGR gas starts, in accordance with the basic required EGR valve opening degree.

Further, according to a tenth aspect of the present invention, in the third or fourth aspect, when an intake air temperature is less than or equal to the dew-point temperature or a temperature that is higher by a predetermined margin than the dew-point temperature, the compressor control means may determine that the temperature of the EGR valve is less than or equal to the dew-point temperature or a temperature that is higher by a predetermined margin than the dew-point temperature.

Further, according to an eleventh aspect of the present invention, in the tenth aspect, even when introduction of EGR gas is started under a situation in which the intake air temperature is less than or equal to the dew-point temperature or a temperature that is higher by a predetermined margin than the dew-point temperature, in a case in which an elapsed time period from a time at which the EGR valve is closed during engine operation is less than a time period from the time at which the EGR valve is closed until water droplets attach to a surface of the EGR valve, the compressor control means may control the compressor rotational speed after introduction of EGR gas starts, in accordance with the basic required compressor rotational speed.

Further, according to a twelfth aspect of the present invention, in the tenth aspect, even when introduction of EGR gas is started under a situation in which the intake air temperature is less than or equal to the dew-point temperature or a temperature that is higher by a predetermined margin than the dew-point temperature, in a case in which the temperature of the EGR valve at engine startup that is estimated based on an engine cooling water temperature or an engine lubricating oil temperature is higher than the dew-point temperature or a temperature that is higher by a predetermined margin than the dew-point temperature, the compressor control means may control the compressor rotational speed after introduction of EGR gas starts, in accordance with the basic required compressor rotational speed.

According to the first aspect of the present invention, in a case where introduction of EGR gas is started, the compressor rotational speed is restricted so as not to exceed a predetermined rotational speed. As described above, if the EGR valve is cold when starting introduction of EGR gas, there is a possibility that condensed water will be attached to the surface of the EGR valve. If condensed water is attached to the valve surface, there is a possibility that when the EGR valve is opened the condensed water will detach from the EGR valve and flow into the compressor. The occurrence of an erosion phenomenon in a compressor is attributable to a fact that the relative velocity between water droplets and the compressor is large and that the inertia (mass) of the water droplets is large. According to the present invention, when introduction of EGR gas is started, the aforementioned relative velocity can be lowered by restricting the compressor rotational speed. Therefore, by appropriately setting the aforementioned predetermined rotational speed, the occurrence of an erosion phenomenon at a compressor that is caused by condensed water from an EGR valve can be suppressed without requiring a particular addition or change to the hardware configuration.

At a time of cold starting, there is a high possibility of condensed water being attached to the surface of the EGR valve because the temperature is low. Therefore, according to the second aspect of the present invention, by adopting a configuration so as to restrict the compressor rotational speed in a manner that takes a case in which introduction of EGR gas is started for the first time after cold starting as an object, the occurrence of an erosion phenomenon at an impeller can be effectively suppressed while reducing as much as possible the occasions in which the restriction is implemented.

According to the third aspect of the present invention, in a case where introduction of EGR gas is started under a situation in which condensed water has been generated at the EGR valve that is in a closed state or there is a possibility that such condensed water has been generated, the compressor rotational speed is restricted so as not to exceed the predetermined rotational speed. Therefore, according to the present invention, restriction of the compressor rotational speed can be implemented while more appropriately ascertaining the situation in which the restriction should be implemented.

According to the fourth aspect of the present invention, a time period in which restriction of the compressor rotational speed should be implemented in order to protect the compressor can be appropriately set.

In a spark-ignition internal combustion engine, an intake air amount is adjusted to control the engine torque. If the compressor rotational speed is the same before and after introduction of EGR gas, the intake air amount will decrease in accordance with the amount of EGR gas that is introduced. According to the fifth aspect of the present invention, in a configuration that is based on the premise that the compressor rotational speed is controlled in accordance with a basic required compressor rotational speed that is determined by taking into consideration a basic required EGR valve opening degree (that is, a required EGR gas amount), as a countermeasure with respect to the above described condensed water, the compressor rotational speed after introduction of EGR gas starts is restricted so as not to exceed the predetermined rotational speed. Further, accompanying restriction of the compressor rotational speed, the EGR valve opening degree after introduction of EGR gas starts is reduced to the aforementioned first required EGR valve opening degree. By this means, the occurrence of an erosion phenomenon can be suppressed by controlling the compressor rotational speed, while also suppressing a change in the engine torque that accompanies restriction of the compressor rotational speed and introduction of EGR gas.

According to the sixth aspect of the present invention, a second required EGR valve opening degree is used that is less than the basic required EGR valve opening degree. The basic required EGR valve opening degree corresponds to an EGR valve opening degree in a case where EGR gas is introduced while restricting the compressor rotational speed by utilizing the aforementioned predetermined rotational speed itself. By this means, the flow velocity of EGR gas passing through the EGR valve after introduction of EGR gas starts can be increased. As a result, detachment of water droplets from the EGR valve can be promoted, and hence a time period in which the compressor rotational speed should be restricted after introduction of EGR gas starts can be reduced. Thus, although the EGR gas amount immediately after introducing EGR gas decreases in comparison to a case of utilizing the aforementioned basic required EGR valve opening degree, promoting the detachment of water droplets from the EGR valve makes it possible to ultimately introduce the originally required amount of EGR gas more quickly.

According to the seventh or tenth aspect of the present invention, whether or not the situation is one in which condensed water has been generated at the EGR valve can be determined by utilizing an intake air temperature that can be measured utilizing a temperature sensor that is often mounted in an internal combustion engine.

The EGR valve has a heat capacity. Therefore, after the EGR valve is closed after the introduction of EGR gas, the temperature of the EGR valve approaches the intake air temperature as a result of being exposed to low-temperature intake air. According to the eighth or eleventh aspect of the present invention, in a case in which the existence or non-existence of condensed water at the EGR valve is determined by using the intake air temperature as an indicator, under a situation in which condensed water has not been generated at the EGR valve even though the intake air temperature is low because only a small period of time has passed since the time point at which the EGR valve was closed, unnecessary restriction of the compressor rotational speed when starting introduction of EGR gas can be avoided. In addition, according to the eighth aspect of the present invention, an unnecessary decrease in the EGR gas can also be avoided.

The EGR valve has a heat capacity. Therefore, if the internal combustion engine is stopped, after the EGR valve is closed after the introduction of EGR gas, the temperature of the EGR valve approaches the outdoor air temperature accompanying the passage of time. According to the ninth or twelfth aspect of the present invention, in a case in which the existence or non-existence of condensed water at the EGR valve is determined by using the intake air temperature as an indicator, under a situation in which condensed water has not been generated at the EGR valve even though the intake air temperature is low because only a small period of time has passed since the time point at which the EGR valve was closed, unnecessary restriction of the compressor rotational speed when starting introduction of EGR gas can be avoided. In addition, according to the twelfth aspect of the present invention, an unnecessary decrease in the EGR gas can also be avoided.

BRIEF DESCRIPTION OF DRAWINGS

FIG. 4(A) to FIG. 4(F) are views illustrating time charts for describing an overview of impeller rotational speed control that is performed taking a region B shown in FIG. 3(C) as an object;

FIG. 8(A) to FIG. 8(F) are views illustrating time charts that represent operations when impeller rotational speed control is executed in Embodiment 2 of the present invention;

FIG. 16 is a flowchart of a routine for controlling the compressor rotational speed and the EGR valve opening degree; and FIG. 17 is another routine for controlling the compressor rotational speed and the EGR valve opening degree.

DESCRIPTION OF EMBODIMENTS

Embodiment 1

<System Configuration of Internal Combustion Engine>

Figure 1:
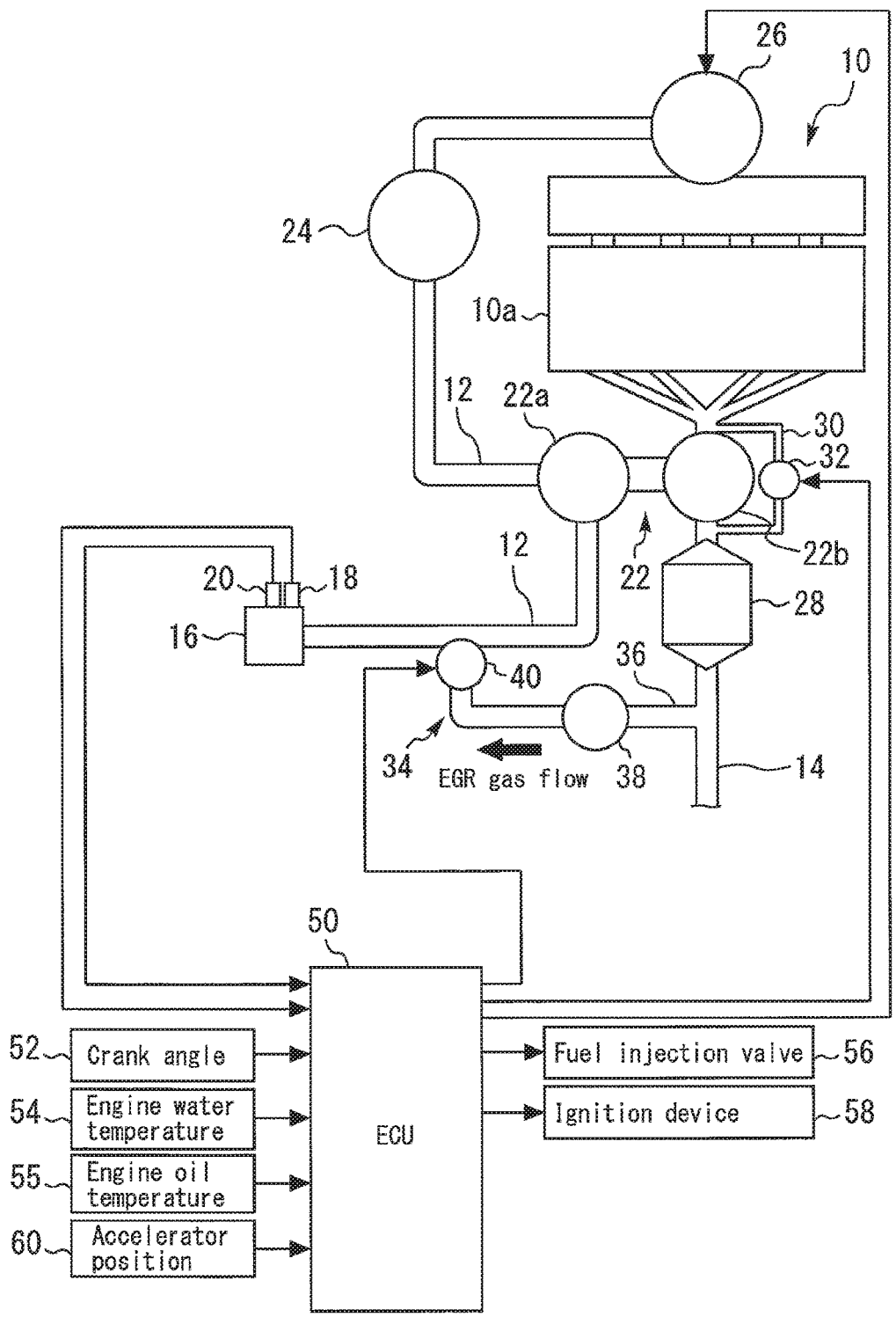
FIG. 1 is a view for describing the system configuration of an internal combustion engine of Embodiment 1 of the present invention.

FIG. 1 is a view for describing the system configuration of an internal combustion engine 10 of Embodiment 1 of the present invention. A system of the present embodiment includes an internal combustion engine (as one example, a spark-ignition gasoline engine) 10. An intake passage 12 and an exhaust passage 14 communicate with each cylinder of the internal combustion engine 10. The internal combustion engine 10 includes a cylinder block 10a.

An air cleaner 16 is installed in the vicinity of an inlet of the intake passage 12. An air flow meter 18 that outputs a signal in accordance with a flow rate of air that is drawn into the intake passage 12, and an intake air temperature sensor 20 for detecting the temperature of intake air are respectively provided in the air cleaner 16. A compressor 22a of a turbocharger 22 is arranged downstream of the air cleaner 16. The compressor 22a is integrally connected through a connecting shaft with a turbine 22b arranged in the exhaust passage 14. Although in this case it is assumed that, as one example, the compressor 22a is of a type that has a centrifugal impeller, as long as a compressor that is an object of the present invention is of a type in which a problem that is described later (an erosion phenomenon with respect to the impeller that is caused by water droplets colliding with the impeller) arises, the compressor is not limited to a type that has a centrifugal impeller.

A water-cooled intercooler 24 for cooling air that was compressed by the compressor 22a is provided downstream of the compressor 22a. An electronically controlled throttle valve 26 is provided downstream of the intercooler 24.

An exhaust gas purification catalyst (as one example, a three-way catalyst) 28 is arranged in the exhaust passage 14 at a position that is on a downstream side relative to the turbine 22b. An exhaust bypass passage 30 is also connected to the exhaust passage 14. The exhaust bypass passage 30 connects an inlet side and an outlet side of the turbine 22b in a manner that bypasses the turbine 22b. A waste gate valve (WGV) 32 for opening and closing the exhaust bypass passage 30 is installed in the exhaust bypass passage 30. As one example, it is assumed that the WGV 32 is a waste gate valve that is driven by an electric motor.

The internal combustion engine 10 illustrated in FIG. 1 also includes a low-pressure loop (LPL) type EGR device 34. The EGR device 34 includes an EGR passage 36 that connects the exhaust passage 14 on the downstream side of the exhaust gas purification catalyst 28 with the intake passage 12 on the upstream side of the compressor 22a. An EGR cooler 38 and an EGR valve 40 are respectively provided in the EGR passage 36 in that order from an upstream side of a flow of EGR gas when the EGR gas is introduced into the intake passage 12. The EGR cooler 38 is provided for cooling EGR gas that flows through the EGR passage 36. The EGR valve 40 is provided for regulating the amount of EGR gas that passes through the EGR passage 36 and recirculates to the intake passage 12.

The system illustrated in FIG. 1 also includes an ECU (electronic control unit) 50. The ECU 50 includes a central processing unit (CPU), a memory circuit constituted by a ROM and a RAM or the like, and input and output ports and the like. In addition to the aforementioned air flow meter 18 and intake air temperature sensor 20, various sensors for detecting the operating state of the internal combustion engine 10 such as a crank angle sensor 52 for detecting the engine speed, a water temperature sensor 54 for detecting the engine cooling water temperature, and an oil temperature sensor 55 for detecting the engine lubricating oil temperature are electrically connected to an input part of the ECU 50. Furthermore, in addition to the aforementioned throttle valve 26, WGV 32 and EGR valve 40, various actuators for controlling operations of the internal combustion engine 10 such as a fuel injection valve 56 for supplying fuel to the internal combustion engine 10 and an ignition device 58 for igniting an air-fuel mixture in the cylinders are electrically connected to an output port of the ECU 50. In addition, an accelerator position sensor 60 for detecting a depression amount of an accelerator pedal (accelerator position) of the vehicle in which the internal combustion engine 10 is mounted is also connected to the input port of the ECU 50. The ECU 50 controls the operations of the internal combustion engine 10 by actuating the various actuators in accordance with the output of the various sensors described above and predetermined programs.

Figures 2A, 2B, 2C:
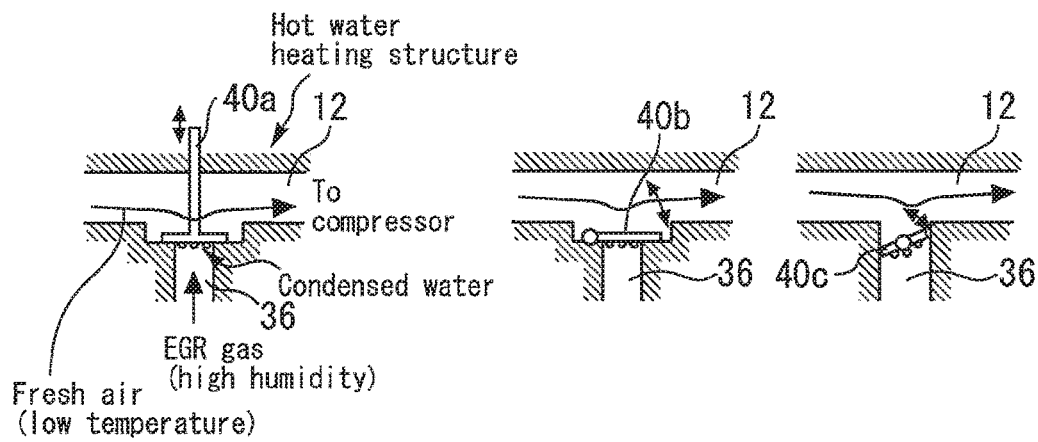
FIG. 2(A) to FIG. 2(C) are views for describing specific configuration examples and arrangement environments of an EGR valve shown in FIG. 1.

FIG. 2(A) to FIG. 2(C) are views for describing specific configuration examples and arrangement environments of the EGR valve 40 shown in FIG. 1. For example, a poppet-type EGR valve 40a, a flap-type EGR valve 40b, or a butterfly-type EGR valve 40c that are illustrated in FIG. 2(A) to FIG. 2(C) can be used as the EGR valve 40 of the present embodiment. According to these configurations, when the EGR valve 40 is in a closed state the surface of the valve body and the valve stem on the intake passage 12 side is exposed to low-temperature intake air (fresh air). Note that, in the internal combustion engine 10, the wall surface of the EGR passage 36 and the intake passage 12 around the EGR valve 40 is configured so as to be heated by the engine cooling water.

<Problem Accompanying Generation of Condensed Water on EGR Valve Surface>

In an initial warm-up stage after commencing startup from a cold state, condensed water is liable to be generated if EGR gas is introduced. Therefore, the EGR valve is normally closed during the initial warm-up stage. However, even if the EGR valve is in a closed state, high-humidity exhaust gas is present in the EGR passage on the upstream side of the flow of EGR gas relative to the EGR valve. Consequently, if moisture contained in the exhaust gas contacts the EGR valve that is cold, in some cases condensation of moisture occurs on the surface of the EGR valve that is on the side that is exposed to the exhaust gas, thereby generating condensed water. This fact similarly applies even in a case where a configuration is adopted so that the wall surface of a passage around the EGR valve is heated by cooling water as in the configurations illustrated in FIGS. 2(A) to (C), because the cooling water temperature is low during the initial warm-up stage.

Further, if the configuration is such that the surface of the EGR valve on the intake passage 12 side is liable to be directly exposed to intake air while the EGR valve is closed, as in the configuration illustrated in FIG. 2(A), even if the wall surface of the passage around the EGR valve is heated, it is difficult for the EGR valve itself to become warm and also to keep the EGR valve warm. Therefore, even after warming up is completed, if the EGR valve that is in a closed state is cooled to a temperature that is less than or equal to the dew-point temperature of exhaust gas (more specifically, exhaust gas that is present inside the EGR passage on an upstream side relative to the EGR valve) by low-temperature intake air, condensed water will be generated on the surface of the EGR valve. Further, unlike the configurations illustrated in FIG. 2(A) to (C), even in a case where the EGR valve is disposed at a location that is partway along the EGR passage that is a location that is separated from an end of the EGR passage on the intake passage side, when the EGR valve is closed, the EGR passage that is on the downstream side relative to the EGR valve is filled with fresh air due to pulsation of the intake air. Therefore, although it can be said that the EGR valve is less liable to be exposed to intake air in comparison to a case where the EGR valve is disposed at the end of the EGR passage on the intake passage side, even when such an arrangement is adopted, the EGR valve that is in a closed state is cooled by low-temperature intake air.

If the EGR valve is opened to perform the introduction of EGR gas without giving special consideration to the occurrence of condensed water at the EGR valve as described above, condensed water that has attached to the EGR valve will flow all at once into the intake passage. More specifically, water droplets that were attached to the EGR valve will detach from the EGR valve when the valve is opened, and there is the possibility that water droplets that have a large diameter will flow into the compressor. If water droplets that have flowed into the intake passage are drawn into the compressor, there is a concern that the water droplets will collide with the impeller of the compressor and an erosion phenomenon will thus occur at the impeller.

The occurrence of an erosion phenomenon at an impeller is caused by the fact that the relative velocity between water droplets and the impeller is large and that the inertia (mass) of the water droplets is also large. That is, the occurrence of the aforementioned phenomenon is due to the fact that an impulse that the impeller receives from the water droplets is large. Accordingly, it can be said that the occurrence of an erosion phenomenon can be prevented by reducing the size of the water droplets that flow into the compressor or by lowering the rotational speed of the impeller.

<Characteristic Impeller Rotational Speed Control of Embodiment 1>

Figure 3A:
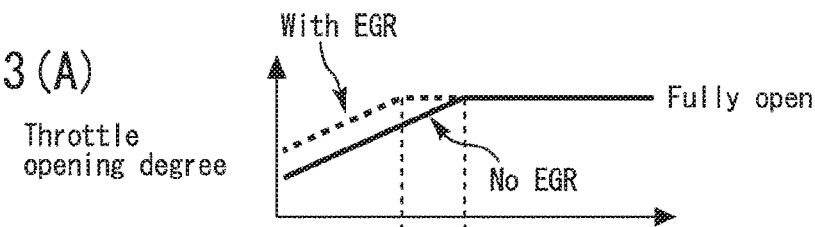
FIG. 3(A) to FIG. 3(C) are views that represent the settings of a throttle opening degree and a WGV opening degree with respect to an engine load factor that are used in Embodiment 1 of the present invention, and also represents, from the viewpoint of the impeller rotational speed, an engine load region in which the occurrence of condensed water constitutes a problem under the aforementioned settings.
Figure 3B:
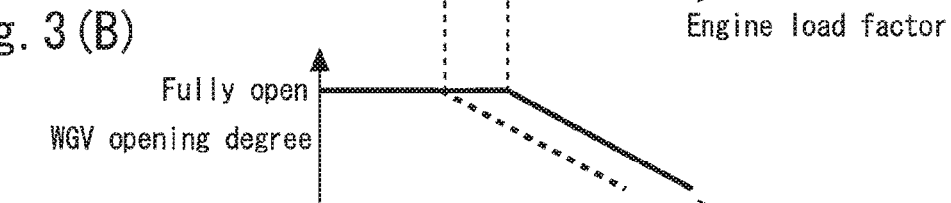
Figure 3C:
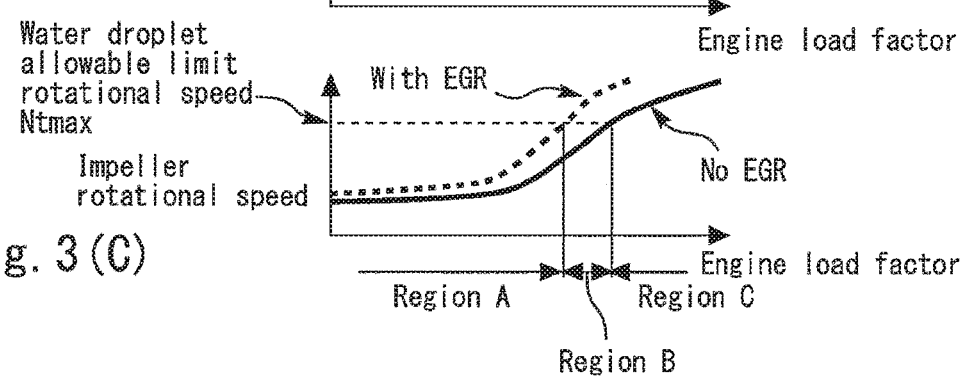

FIG. 3(A) to FIG. 3(C) are views that represent the settings of the throttle opening degree and the WGV opening degree with respect to an engine load factor that are used in Embodiment 1 of the present invention, and also represents, from the viewpoint of the impeller rotational speed, an engine load region in which the occurrence of condensed water constitutes a problem under the aforementioned settings.

(Method for Controlling Throttle Valve and WGV as Premise of Impeller Rotational Speed Control)

First, a case in which EGR gas is not introduced (solid line) will be described. As shown in FIG. 3(A) and FIG. 3(B), in a region on a low load side, the engine load factor (intake air amount) is controlled by adjusting the throttle opening degree in a state in which the WGV 32 has been fully opened. That is, in this region, the throttle valve 26 is opened in accordance with an increase in a required engine load factor. In this region, since the WGV opening degree is constant, the impeller rotational speed only increases slightly with respect to an increase in the engine load factor.

In a region on a high load side relative to an engine load factor at which the throttle opening degree becomes the full opening degree, the WGV 32 is controlled to the closing side in accordance with an increase in the required engine load factor while the throttle opening degree remains constant. By the WGV 32 being closed relative to the full opening degree in this manner, the turbine 22b is rotated by exhaust energy and actual supercharging is started. As a result, the impeller rotational speed increases accompanying a decrease in the WGV opening degree.

Next, a case in which EGR gas is introduced (broken line) is described. The introduction of EGR gas is implemented not only in a natural aspiration region in which the WGV 32 is opened fully, but also in one part of a supercharging region in which the WGV 32 is closed relative to the full opening degree. The basic method for controlling the throttle valve 26 and the WGV 32 in a case where EGR gas is introduced is the same as the case where EGR gas is not introduced. However, when introduction of EGR gas is performed, in order to enable the internal combustion engine 10 to produce torque that is equivalent to the torque produced when EGR gas is not introduced, the throttle opening degree is made greater than the degree thereof in a case where EGR gas is not introduced under the same engine load factor. Accordingly, when the engine load factor is a low value in comparison to the value thereof when EGR gas is not introduced, the throttle opening degree becomes the full opening degree. The WGV 32 is therefore configured so that the WGV 32 begins to close at a lower engine load factor than a value in the case where EGR gas is not introduced. Note that, the degree of divergence of the broken line relative to the solid line for each of the throttle opening degree and the WGV opening degree shown in FIG. 3(A) and FIG. 3(B), respectively, is a degree of divergence at a certain EGR rate, and the degree of divergence increases as the EGR rate that is used increases.

Therefore, for the above described reasons, within an engine load region that is attainable accompanying the introduction of EGR gas, the impeller rotational speed during EGR gas introduction becomes higher overall in comparison to when EGR gas is not introduced. Specifically, in a non-supercharging region (natural aspiration region) on the low load side, the impeller rotational speed during EGR gas introduction becomes higher than that at a time when EGR gas is not introduced because the throttle opening degree is made relatively larger for ensuring the same engine load factor. Further, during EGR gas introduction, a value of the engine load factor at which the impeller rotational speed begins to exhibit a significant increase because of the start of supercharging changes to the low load side in comparison to when EGR gas is not introduced.

(Engine Load Region that is Object of Impeller Rotational Speed Control)

Figure 7A:
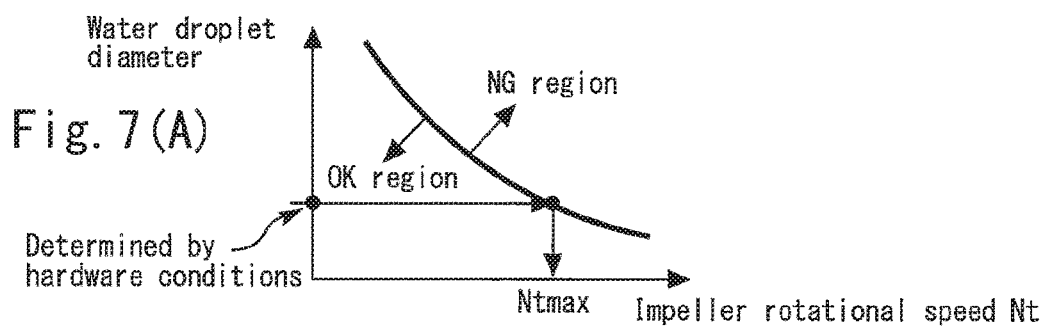
FIG. 7(A) and FIG. 7(B) are views for describing a combination between a water droplet allowable limit rotational speed Ntmax that is determined in accordance with the diameter of water droplets flowing into a compressor, a WGV opening degree within a range in which the impeller rotational speed Nt does not exceed Ntmax, and an EGR valve opening degree.

In the control of the present embodiment, a water droplet allowable limit rotational speed (hereunder, also referred simply to as "limit rotational speed") Ntmax is set with respect to the impeller rotational speed. The water droplet allowable limit rotational speed Ntmax is a value that is set in advance so as to include a predetermined margin as an impeller rotational speed at which the occurrence of an erosion phenomenon is not a concern even if condensed water that was attached to the closed EGR valve 40 flows into the compressor 22a when the EGR valve 40 is opened. In other words, the water droplet allowable limit rotational speed Ntmax is a compressor rotational speed that is allowed in a case where it is supposed that droplets of condensed water that were attached to the closed EGR valve 40 will flow into the compressor 22a when the EGR valve 40 is opened. More specifically, the diameter of water droplets that flow into the compressor 22a depends on the hardware condition of the internal combustion engine 10 (for example, the length of the intake passage 12 from a merging portion with the EGR passage 36 to the compressor inlet). A relation as shown in FIG. 7(A) that is described later exists between the diameter of the water droplets and the impeller rotational speed, and the limit rotational speed Ntmax under an assumed diameter of the water droplets is determined taking into account the relation in FIG. 7(A). Note that, in the turbocharger 22, the rotational speed of the impeller of the compressor 22a (that is, the compressor rotational speed) is equal to the turbine rotational speed Nt. Hence, the aforementioned two rotational speeds are not particularly distinguished from each other in the following description, and are referred to as "impeller rotational speed Nt" or "turbine rotational speed Nt".

A region A that is illustrated in FIG. 3(C) is an engine load region for which an engine load factor when the impeller rotational speed Nt reaches the limit rotational speed Ntmax in a state in which EGR gas is introduced is taken as an upper limit. That is, the region A is a region in which the impeller rotational speed Nt does not exceed the limit rotational speed Ntmax even if the impeller rotational speed Nt is increased for introduction of EGR gas. Accordingly, it can be said that in the region A it is not necessary to implement a special countermeasure with respect to the inflow of the above described condensed water into the compressor 22a.

The region B is an engine load region that continues from the region A, and is on a high load side relative to the region A. An upper limit of the region B is an engine load factor at which the impeller rotational speed Nt reaches the limit rotational speed Ntmax in a state in which EGR gas is not introduced. Accordingly, in the region B, although the impeller rotational speed Nt will not exceed the limit rotational speed Ntmax if EGR gas is not introduced, the impeller rotational speed will exceed the limit rotational speed Ntmax when the impeller rotational speed Nt increases accompanying the introduction of EGR gas.

Therefore, according to the present embodiment, a configuration is adopted so that in a case where introduction of EGR gas is started under a situation in which the temperature of the EGR valve 40 is less than or equal to a predetermined value X1 and where the impeller rotational speed Nt that is required when starting the introduction of the EGR gas is higher than the limit rotational speed Ntmax, the impeller rotational speed Nt after introduction of EGR gas starts is restricted so as not to exceed the limit rotational speed Ntmax. Specifically, in this case, a configuration is adopted that restricts the impeller rotational speed Nt so as not to exceed the limit rotational speed Ntmax throughout a protection time period T3 after introduction of EGR gas starts. Further, based on the premise that the throttle valve 26 and the WGV 32 are controlled according to the control methods illustrated in FIG. 3(A) and FIG. 3(B), this kind of impeller rotational speed control corresponds to "lowering the impeller rotational speed Nt to a speed that is less than the limit rotational speed Ntmax throughout the protection time period T3 after introduction of EGR gas starts in a case where the EGR valve 40 is opened to start the introduction of EGR gas under a situation in which the engine load region is in region B and where condensed water is generated at the EGR valve 40." Since the present impeller rotational speed control is characteristic control of the present embodiment, the details thereof will be described later. Note that, an engine load factor that is a boundary between region A and region B changes as the EGR rate changes. Accordingly, when the EGR rate changes, the region B that is the object of the present impeller rotational speed control also changes.

Note that, a region C is an engine load region that continues from the region B, and is on the high load side relative to the region B. In the region C, the impeller rotational speed Nt exceeds the limit rotational speed Ntmax in a state in which EGR gas is not introduced. Accordingly, under a situation in which the engine load region is in the region C, even if condensed water has been generated at the EGR valve 40 at the time that introduction of EGR gas starts, the impeller rotational speed Nt cannot be lowered to a speed that is less than or equal to the limit rotational speed Ntmax. Consequently, in this case, introduction of EGR gas (opening of the EGR valve 40) is prohibited until the temperature of the EGR valve 40 rises to a temperature at which condensed water that is attached to the EGR valve 40 is eliminated (evaporated) or until the engine load region transitions to the region B or region A that are on the low load side relative to the region C.

(Overview of Impeller Rotational Speed Control)

FIG. 4(A) to FIG. 4(F) are views illustrating time charts for describing an overview of the impeller rotational speed control that is performed taking the region B that is illustrated in FIG. 3(C) as an object. Note that, as one example, FIG. 4(A) to FIG. 4(F) represent a situation in which introduction of EGR gas is started during warm-up running in a state in which the accelerator position is made constant (that is, a state in which the torque that the driver demands with respect to the internal combustion engine 10 is constant).

As shown in FIG. 4(B), during engine warm-up, the engine cooling water temperature gradually increases, while on the other hand, the intake air temperature (outdoor air temperature) remains low. When the engine cooling water temperature increases as far as an EGR permissible water temperature at which the introduction of EGR gas is permitted, an EGR permission flag is turned "on" as shown in FIG. 4(C). As a result, introduction of EGR gas is started.

Waveforms that are illustrated by broken lines in FIGS. 4(D) to (F) indicate operation at a normal time (more specifically, at the time of a high intake air temperature at which condensed water is not generated on the surface of the EGR valve 40 that is in a closed state). If the EGR valve 40 is opened without giving any particular consideration thereto, the intake air amount will decrease when EGR gas is introduced into the intake passage 12, and the engine torque will decrease in accompaniment therewith. The region B is a region in which the engine load factor (intake air amount) is controlled by adjusting the WGV opening degree as described above. Consequently, to avoid a decrease in the intake air amount as described above, the WGV opening degree is controlled to an opening degree towards the closed side as indicated by the broken line in FIG. 4(E) accompanying opening of the EGR valve 40 as indicated by the broken line in FIG. 4(D). When the impeller rotational speed Nt is increased as indicated by the broken line in FIG. 4(F) by controlling the WGV opening degree in this manner, the supercharging pressure can be increased so that the intake air amount does not decrease accompanying the introduction of EGR gas. Note that, a configuration is adopted so that the amount of EGR gas that is introduced into the intake passage 12 is changed in accordance with the engine cooling water temperature. Consequently, in the control example illustrated in FIG. 4(A) to FIG. 4(F) which assume that the operations are performed during a warming-up period, after introduction of EGR gas starts, as the engine cooling water temperature rises together with the passage of time, the EGR valve opening degree is increased in order to increase the EGR gas amount. The WGV opening degree is controlled toward the closed side accompanying this change in the EGR valve opening degree.

In contrast, in a case where condensed water is generated at the EGR valve 40 because the intake air temperature (outdoor air temperature) is low, (more specifically, in a case where the temperature of the EGR valve 40 is less than or equal to the dew point of the EGR gas), the WGV opening degree is set so as to become WGVmin that is a WGV opening degree corresponding to the limit rotational speed Ntmax under the current exhaust gas flow rate (see the solid line in FIG. 4(E)). That is, an opening degree WGVmin that is further on the open side than the WGV opening degree at the time of normal operation is used. By this means, since the impeller rotational speed Nt is restricted at the limit rotational speed Ntmax as illustrated by the solid line in FIG. 4(F), the collision speed between water droplets and the impeller when water droplets flow into the compressor 22a accompanying opening of the EGR valve 40 can be lowered (that is, an impulse that the impeller receives from water droplets can be reduced). Consequently, the occurrence of an erosion phenomenon can be prevented.

(Torque Adjustment Before and after Introduction of EGR Gas)

If the lift amount (opening degree) of the EGR valve 40 remains at the value thereof for a time of normal operation at a time when the WGV opening degree has been set to the opening degree WGVmin that is on the open side as described above as a countermeasure for condensed water, unlike a time of normal operation, the intake air amount (engine torque) cannot be maintained at a constant amount with respect to before and after the introduction of EGR gas. More specifically, the supercharging pressure will decrease if the impeller rotational speed Nt is lowered. If the supercharging pressure decreases, the intake air amount and the EGR gas amount will also decrease (that is, the overall amount of gas drawn into the cylinders will decrease). It is necessary to reduce the EGR gas amount in order to keep the intake air amount constant under such a situation. Accordingly, as shown by the solid line in FIG. 4(D), the EGR valve opening degree is set to a smaller value compared to a normal time. An EGR valve opening degree EGR1 in this case is an opening degree that corresponds to an EGR gas amount (Gegr1 that is described later) that can be introduced under a supercharging pressure that is obtained under a situation in which the WGV opening degree has been controlled to the opening degree WGVmin without changing the intake air amount before and after opening of the EGR valve 40.

(Protection Time Period T3 for Performing Impeller Rotational Speed Control)

As shown in FIG. 4(A) to FIG. 4(F), control of the WGV opening degree and the EGR valve opening degree for the above described impeller rotational speed control is executed throughout the predetermined protection time period T3 after introduction of EGR gas starts. The protection time period T3 is a period in which there is a possibility of water droplets that were attached to the EGR valve 40 flowing into the compressor 22a after opening of the EGR valve 40. For example, it is favorable to set the protection time period T3 according to the method described below.

According to the present method, the protection time period T3 for protecting the impeller is represented as the sum of a valve detachment time period T1 and an intake pipe transit time period T2. The valve detachment time period T1 is a time period from a time point at which the EGR valve 40 starts to open until a time point at which water droplets that are attached to the surface of the closed EGR valve 40 start to detach from the EGR valve 40 as a result of being drawn by a flow of EGR gas. The intake pipe transit time period T2 is a time period from a time point at which water droplets start to detach from the EGR valve 40 until a time point at which the water droplets finish arriving at the inlet of the compressor 22a.

With regard to the intake pipe transit time period T2, the following three forms (a) to (c) are assumed as forms of movement of the water droplets after detaching from the EGR valve 40 and flowing into the intake passage 12. Form (a) is a form in which the water droplets attach to the wall surface of the intake passage 12, flow along the wall surface, and arrive at the inlet of the compressor 22a. Form (b) is a form in which although the water droplets attach to the wall surface of the intake passage 12 and flow along the wall surface, the water droplets evaporate before arriving at the inlet of the compressor 22a. Form (c) is a form in which the water droplets fly through the space inside the intake passage 12 and arrive at the compressor 22a without attaching to the wall surface of the intake passage 12. It is considered that, in practice, a portion of the water droplets that flow into the intake passage 12 move in the manner of form (c), and the remaining water droplets move in the manner of either one of or both of form (a) and form (b).

It can be said that whether water droplets that have attached to the wall surface of the intake passage arrive at the inlet of the compressor or evaporate partway along the intake passage basically depends on the hardware conditions of the internal combustion engine (specifically, the length of the intake passage from an EGR gas introduction portion to the compressor). Further, in a case where a configuration is adopted in which the intake passage on an upstream side of the compressor is heated by engine cooling water, as in the case of the internal combustion engine 10, it is also conceivable that whether water droplets flow along the wall surface and arrive at an inlet of the compressor or evaporate partway along the intake passage changes depending on the engine cooling water temperature. On the other hand, it can be said that the time required for water droplets to complete their flight (herein, also referred to as "time-of-flight T22") in form (c) is substantially short relative to the time required for water droplets to complete their arrival at the inlet of the compressor via the wall surface (herein, also referred to as "time-of-sliding T21") in form (a).

Based on the foregoing, it can be said that (1) if the internal combustion engine is an engine with respect to which, on the basis of a determination based on the hardware condition that is described above, it can be said that water droplets that attached to the wall surface of the intake passage do not arrive at the compressor inlet, the time-of-flight T22 may be treated as the intake pipe transit time period 12. On the other hand, it can be said that (2) if the internal combustion engine is an engine with respect to which, on the basis of a determination based on the hardware condition that is described above, it can be said that water droplets that attached to the wall surface of the intake passage sometimes arrive at the compressor inlet, the time-of-sliding T21 may be treated as the intake pipe transit time period T2. However, even in the case of (2), in the case of an internal combustion engine in which whether water droplets flow along the wall surface and arrive at the compressor inlet or evaporate partway along the wall surface changes depending on the engine cooling water temperature, a time period that is used as the intake pipe transit time period T2 may be changed in accordance with the engine cooling water temperature. Specifically, under a water temperature condition with respect to which it can be said that water droplets evaporate because the engine cooling water temperature is high, the time-of-flight T22 may be treated as the intake pipe transit time period T2, and under a water temperature condition with respect to which it can be said that water droplets arrive at the compressor inlet because the engine cooling water temperature is low, the time-of-sliding T21 may be treated as the intake pipe transit time period T2.

(Specific Processing in Embodiment 1)

Figure 5:
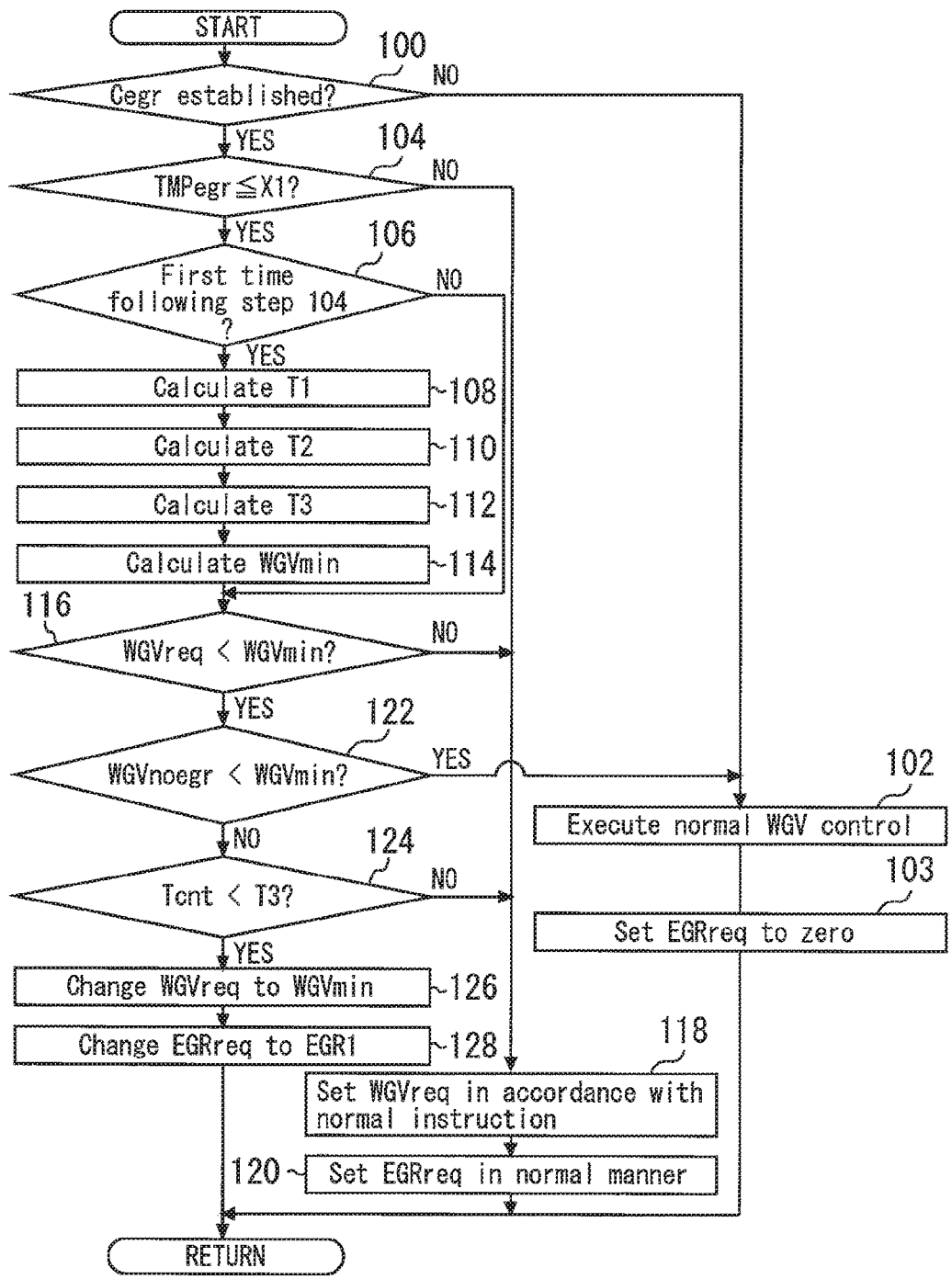
FIG. 5 is a flowchart of a routine executed in Embodiment 1 of the present invention.

FIG. 5 is a flowchart illustrating a routine that is executed by the ECU 50 in Embodiment 1 of the present invention. Note that the present routine is repeatedly executed for each predetermined control period.

In the routine illustrated in FIG. 5, first the ECU 50 determines whether or not a predetermined EGR introduction condition (Cegr) is established (step 100). More specifically, the EGR introduction condition is established when the engine cooling water temperature is within a predetermined range and a predetermined EGR prohibition condition is not established. Introduction of EGR gas is started accompanying establishment of the EGR introduction condition.

If it is determined in step 100 that the EGR introduction condition is not established, the ECU 50 executes normal WGV control (step 102). According to the normal WGV control, the WGV opening degree is controlled so as to become a required WGV opening degree in accordance with the current engine load factor and engine speed. Next, the ECU 50 proceeds to step 103 and sets the required EGR valve opening degree (EGRreq) to zero. That is, in this case, introduction of EGR gas is not performed (is prohibited).

In contrast, if it is determined in step 100 that the EGR introduction condition is established, the ECU 50 subsequently determines whether or not the temperature of the EGR valve 40 (TMPegr) is less than or equal to the predetermined value X1 (step 104). Here, the term "predetermined value X1" refers to a temperature at which condensation of moisture starts to occur at the EGR valve 40 (that is, the dew-point temperature of exhaust gas that is present in the vicinity of the EGR valve 40 that is in a closed state). By performing the processing in the present step 104, it is determined whether or not the current situation is one in which condensed water has been generated at the EGR valve 40. Note that, whether the result determined in the present step 104 is affirmative or negative directly relates to whether or not it is necessary to execute the impeller rotational speed control of the present embodiment. Execution of the present impeller rotational speed control is not limited to a case where it is determined that condensed water is probably actually generated on the surface of the EGR valve 40 since the EGR valve temperature is equal to or less than the dew-point temperature of exhaust gas. That is, the present control may also be executed in a manner that includes a safety margin so that the control is executed under a situation in which, although the EGR valve temperature is higher than the dew-point temperature, there is a possibility that condensed water has been generated on the surface of the EGR valve 40 since the EGR valve temperature is a temperature that is close to the dew-point temperature. Accordingly, a temperature that is higher by a predetermined margin with respect to the aforementioned dew-point temperature of the exhaust gas may also be used as the above described predetermined value X1. For example, a constant value that was determined in advance can be used as the dew-point temperature of the exhaust gas that is to be used as the predetermined value X1. However, if it is possible to estimate or detect the temperature of exhaust gas that is present in the vicinity of the EGR valve 40, the dew-point temperature may be calculated as a variable value that is based on the temperature of the exhaust gas. Further, since the dew-point temperature calculated in this case is the dew-point temperature of exhaust gas that stagnates in the EGR passage 36 in the vicinity of the EGR valve 40 (that is, gas that includes a fixed proportion of moisture), a constant value or the like may be used as described above. However, the dew-point temperature is a value that changes in accordance with the humidity of the gas. Therefore, a configuration may also be adopted in which the humidity of the stagnant exhaust gas is detected or estimated, and the dew-point temperature is calculated in a manner that takes the humidity into consideration.

Although means for acquiring the temperature of the EGR valve 40 in step 104 is not particularly limited, for example, the EGR valve temperature can be estimated as a value that is calculated by means of a function of the intake air temperature, the engine cooling water temperature and time.

Specifically, a data table (not illustrated in the drawings) that defines a base value $T_{eo}$ of the temperature of the EGR valve 40 by means of a relation with the intake air temperature and the engine cooling water temperature is stored in the ECU 50. Here, the term "base value $T_{eo}$" refers to a steady-state temperature of the EGR valve 40 when the intake air temperature and the engine cooling water temperature are each an arbitrary temperature. According to this method, a value $T_{eo}$, corresponding to the intake air temperature that is detected by the intake air temperature sensor 20 and the engine cooling water temperature that is detected by the water temperature sensor 54 is acquired by referring to the data table. Based on the value $T_{eo}$, a current temperature $T_n$ of the EGR valve 40 that changes in a manner that is accompanied by a temporal lag upon receiving the influence of a change in the intake air temperature and engine cooling water temperature is calculated in accordance with Equation (1). Note that, in Equation (1), $T_{n-1}$ represents the previous value of the temperature of the EGR valve 40, and k represents a smoothing coefficient (0<k<1) that is set in advance. Further, it is assumed that the water temperature sensor 54 measures the engine cooling water temperature at a position that has a correlation with the engine cooling water temperature in the housing of the EGR valve 40.

$$T_n = T_{n-1} + (T_{eo} - T_{n-1}) \times k \quad (1)$$

Further, the EOR valve temperature that is used in step 104 may be a temperature that is detected by a sensor if it is possible to do so. Alternatively, for example, as described later in Embodiment 3, when the intake air temperature is less than or equal to the predetermined value X1, it may be determined that the situation is one in which the EGR valve temperature is less than or equal to the predetermined value X1. A temperature at a position that is close to the site at which the EGR valve 40 is disposed (that is, a position in the vicinity of the compressor inlet) is preferable as the intake air temperature referred to in this case. However, as long as the temperature has a correlation with the intake air temperature at the compressor inlet, the intake air temperature at the inlet of the intake passage 12 (nearly equal to outdoor air temperature) that is detected by the intake air temperature sensor 20 may be substituted for the intake air temperature at the compressor inlet, or the outdoor air temperature itself may be used, or a temperature on a downstream side of the compressor may be used.

If it is determined in step 104 that the temperature of the EGR valve is higher than the predetermined value X1, the ECU 50 proceeds to step 118. In contrast, if it is determined that the temperature of the EGR valve is less than or equal to the predetermined value X1, the ECU 50 determines whether or not the current processing cycle is the first cycle after the EGR valve temperature fell below the predetermined value X1 (step 106). If the result of the present determination is affirmative, the ECU 50 executes the series of processing in steps 108 to 114. On the other hand, if the result of the present determination is negative, the ECU 50 proceeds to step 116.

In step 108, the ECU 50 calculates the valve detachment time period T1. The flow rate of EGR gas that passes through the EGR valve 40 is the dominant factor with respect to the valve detachment time period T1. Therefore, in this case, the ECU 50 calculates the valve detachment time period T1 in accordance with a data table (not illustrated in the drawings) that predefines the valve detachment time period T1 so as to be a function of the EGR valve opening degree. In this data table, the valve detachment time period T1 is set so as to become shorter as the EGR valve opening degree decreases (that is, as the flow rate of the EGR gas increases).

In step 110, the ECU 50 calculates the time-of-sliding T21 or the time-of-flight T22 as the intake pipe transit time period T2. For example, the method described above can be used to determine which of the time-of-sliding T21 and the time-of-flight T22 is to be calculated in the present step 110. With respect to the time-of-sliding T21, the contribution of the intake air amount (mass flow rate) is large. Consequently, in this case, the ECU 50 calculates the time-of-sliding T21 m accordance with a data table (not illustrated in the drawings) that predefines the time-of-sliding T21 so as to be a function of the intake air amount. In this data table, the time-of-sliding T21 is set so as to become shorter as the intake air amount increases. Furthermore, with respect to the time-of-flight T22, the contribution of the flow rate of the intake air is large. Further, the flow rate of intake air is in a proportional relation with the intake air amount. Consequently, in this case, the ECU 50 calculates the time-of-flight T22 in accordance with a data table (not illustrated in the drawings) that predefines the time-of-flight T22 so as to be a function of the intake air amount. In this data table, the time-of-flight T22 is set so as to decrease as the intake air amount increases.

In step 112, the ECU 50 calculates the protection time period T3 as the sum of the valve detachment time period T1 and the time-of-sliding T21, or as the sum of the valve detachment time period T1 and the time-of-flight T22. Next, the ECU 50 calculates the lower limit value WGVmin of the WGV opening degree that corresponds to the limit rotational speed Ntmax under the current exhaust gas flow rate (step 114).

Figure 6:
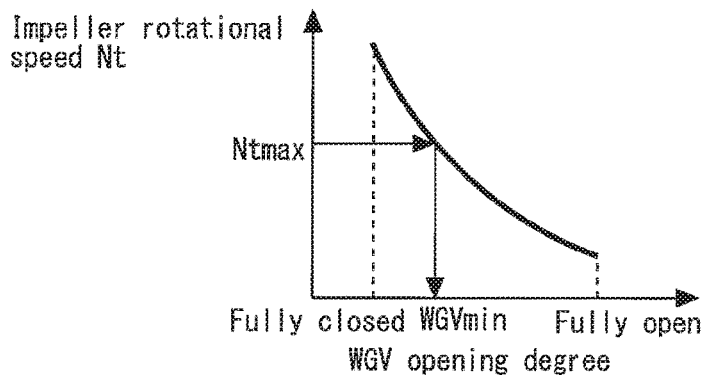
FIG. 6 is a view that represents a relation between a turbine rotational speed Nt and a WGV opening degree under a uniform exhaust gas flow rate.

FIG. 6 is a view that represents the relation between the turbine rotational speed Nt and the WGV opening degree under the same exhaust gas flow rate. If the exhaust gas flow rate is constant, as shown in FIG. 6, the turbine rotational speed Nt increases as the WGV opening degree decreases. In this case, a value that is previously set as a constant value that does not depend on the operating state (engine speed and engine load factor) is used as the limit rotational speed Ntmax. Note that, since the limit rotational speed Ntmax is set while taking the size of the aforementioned impulse into consideration, the limit rotational speed Ntmax may change in accordance with the amount of condensed water that is generated at the EGR valve 40. Specifically, since the generated amount of condensed water increases as the temperature of the EGR valve 40 that is acquired by estimation or the like decreases, the limit rotational speed Ntmax may be lowered in accompaniment therewith.

The ECU 50 has information (a data table or the like) showing the relation between the turbine rotational speed Nt and the WGV opening degree as shown in FIG. 6 for respective predetermined exhaust gas flow rates, and in the present step 114 the lower limit value WGV min corresponding to the limit rotational speed Ntmax is calculated utilizing the aforementioned relation at the current exhaust gas flow rate. Note that the exhaust gas flow rate is equivalent to the sum of a total in-cylinder intake gas amount Geyl and the fuel injection amount under a steady state, and can be calculated as the sum of the intake air amount Ga that is measured by the air flow meter 18, an EGR gas amount Gegr, and the fuel injection amount. The EGR gas amount Gegr can be calculated based on the differential pressure between the intake air and exhaust gas and the EGR valve opening degree.

Next, the ECU 50 determines whether or not the required WGV opening degree (WGVreq) is less than the lower limit value WGVmin (step 116). Under a situation in which EGR gas is introduced when operating in an engine load region that is higher than or equal to the region B in which the engine load factor is controlled by means of the WGV opening degree, in order to ensure that the required engine load factor in accordance with the accelerator position is obtained, the ECU 50 uses processing that is different to the present routine to sequentially calculate the required WGV opening degree as a value that is based on an engine load parameter, the engine speed and the basic required EGR valve opening degree. The engine load factor (in-cylinder air charging rate) or the intake air amount Ga or the like corresponds to the engine load parameter in this case. Further, the WGV opening degree is controlled so as to become the required WGV opening degree that was calculated. The basic required EGR valve opening degree is also sequentially calculated by processing that is different to the present routine. Specifically, the basic required EGR valve opening degree is calculated as a value that is based on an engine load parameter, the engine speed and the engine cooling water temperature.

If it is determined in step 116 that the required WGV opening degree is greater than or equal to the lower limit value WGVmin, the ECU 50 proceeds to step 118 and sets the required WGV opening degree (WGVreq) using a value in accordance with a normal instruction (that is, adjustment of the required WGV opening degree is not performed). Next, the ECU 50 proceeds to step 120 and sets the required EGR valve opening degree (EGRreq) using a value in accordance with a normal instruction (that is, the basic required EGR valve opening degree). That is, adjustment of the required EGR valve opening degree is also not performed.

In contrast, if it is determined in step 116 that the required WGV opening degree is less than the lower limit value WGVmin (the required WGV opening degree is on the closed side relative thereto), the ECU 50 determines whether or not the WGV opening degree (the required WGV opening degree or actual WGV opening degree) immediately prior to the current introduction of EGR gas (WGVnoegr) is less than the lower limit value WGVmin (step 122). If the result of the present determination is affirmative, that is, if the impeller rotational speed Nt immediately prior to the current introduction of EGR gas (that is, in a state where EGR gas is not being introduced) is already higher than the limit rotational speed Ntmax, the ECU 50 proceeds to step 102. According to this processing, in a case where impeller rotational speed control cannot be performed because the engine load region is in the aforementioned region C, introduction of EGR gas is prohibited (step 103).

In contrast, if the result determined in step 122 is negative, the ECU 50 determines whether or not a continuous time period from the time point at which EGR introduction starts (Tcnt) is shorter than the aforementioned protection time period T3 (step 124). If it is determined as a result that the protection time period T3 has not elapsed, the ECU 50 changes the required WGV opening degree (WGVreq) to the lower limit value WGVmin (step 126), and also changes the basic required EGR valve opening degree to the EGR valve opening degree EGR1 (see FIG. 4(D)) that is in accordance with the lower limit value WGVmin (step 128). Further, if the protection time period T3 has elapsed, the processing in steps 118 and 120 is executed.

A case where the EGR introduction condition is established and introduction of EGR gas is started in a situation in which the temperature of the EGR valve 40 is less than or equal to the predetermined value X1 corresponds to a case in which there is a possibility that condensed water that is attached to the EGR valve 40 that is in a closed state will flow into the compressor 22a accompanying opening of the EGR valve 40. According to the routine illustrated in FIG. 5 that is described above, in such a case, if the required WGV opening degree when EGR gas introduction starts is lower than the lower limit value WGVmin (is on the closed side relative thereto), the required WGV opening degree is restricted to the lower limit value WGVmin. Further, this restriction of the required WGV opening degree continues throughout the protection time period T3 from the time point at which the introduction of EGR gas starts. The protection time period T3 is a time period in which there is a possibility that droplets of condensed water from the EGR valve 40 will flow into the compressor 22a. According to this impeller rotational speed control, a state in which the impeller rotational speed Nt becomes higher than the water droplet allowable limit rotational speed Ntmax can be avoided under a situation in which there is a possibility that the water droplets will flow into the compressor 22a. By this means, the occurrence of an erosion phenomenon at the impeller can be prevented by lowering the speed at which the impeller collides with the water droplets (reducing the impulse), without requiring a particular addition or change to the hardware configuration. Further, it can be said that the present control is a countermeasure according to which an inflow of water droplets that were attached to the closed EGR valve 40 into the intake passage 12 together with EGR gas when the EGR valve 40 is opened is itself allowed. Therefore, in comparison to a configuration in which the introduction of EGR gas is simply restricted in order to suppress the occurrence of an erosion phenomenon, it can be said that the present countermeasure makes it possible to suppress the occurrence of an erosion phenomenon while maintaining as much as possible the occasions for introducing EGR gas (for example, while introducing EGR gas at an early stage during engine warm-up).

Further, according to the above described routine, the protection time period T3 is determined based on the valve detachment time period T1 and the intake pipe transit time period T2 (time-of-sliding T21 or time-of-flight T22). By this means, the protection time period T3 for which the impeller rotational speed Nt is restricted can be set to the required minimum time period in a manner that takes into consideration parameters (in the above described example, the EGR valve opening degree and the intake air amount) that mainly influence the behavior of water droplets that detach from the EGR valve 40 and flow into the intake passage 12, and also the form of movement of the water droplets after the water droplets flow into the intake passage 12. By this means, restriction of the EGR gas amount for suppressing torque changes that accompany restriction of the impeller rotational speed Nt can also be suppressed to the required minimum, and hence adverse influences of the present control on NOx emissions can be suppressed to a minimum.

Note that, in the above described Embodiment 1, the compressor rotational speed that is obtained in a state in which the WGV opening degree under an exhaust gas flow rate at the time of calculating a required WGV opening degree is controlled so as to become a required WGV opening degree that is calculated in the processing in step 116 corresponds to "basic required compressor rotational speed" in the first aspect of the present invention, and the water droplet allowable limit rotational speed Ntmax corresponds to "predetermined rotational speed" in the first aspect of the present invention. Further, "compressor control means" in the first aspect of the present invention is realized by the ECU 50 controlling the WGV 32 so as to become the lower limit value WGVmin.

In addition, the basic required EGR valve opening degree that is calculated by the ECU 50 as a value that is based on an engine load parameter, the engine speed and the engine cooling water temperature corresponds to "basic required EGR valve opening degree" in the fifth aspect of the present invention, and the EGR valve opening degree EGR1 corresponds to "first required EGR valve opening degree" in the fifth aspect of the present invention. Further, "EGR valve control means" in the fifth aspect of the present invention is realized by the ECU 50 controlling the EGR valve opening degree so as to become the EGR valve opening degree EGR1.

Embodiment 2

Next, Embodiment 2 of the present invention will be described referring to FIG. 7(A) to FIG. 9.

The system of the present embodiment can be realized by using the hardware configuration illustrated in FIG. 1, and causing the ECU 50 to execute the routine shown in FIG. 9, described later, instead of the routine shown in FIG. 5.

<Characteristic Control of Embodiment 2(EGR Control Accompanying Impeller Rotational Speed Control)>

FIG. 7(A) to FIG. 4(F) are views for describing a combination of the water droplet allowable limit rotational speed Ntmax that is determined in accordance with the diameter of water droplets that flow into the compressor 22a, a WGV opening degree in a range in which the impeller rotational speed Nt does not exceed Ntmax, and the EGR valve opening degree.

An "NG region" and an "OK region" that are shown in FIG. 7(A) represent a region in which an impeller erosion phenomenon constitutes a problem and a region in which the impeller erosion phenomenon does not constitute a problem, respectively. Thus, a relation exists between the diameter of water droplets that is allowed from the viewpoint of the erosion phenomenon and the impeller rotational speed Nt such that the limit rotational speed Ntmax decreases as the droplet diameter increases. Further, because the diameter of water droplets that can actually be generated in the internal combustion engine 10 is determined by the hardware conditions of the internal combustion engine 10 as described in the foregoing, the diameter of the water droplets can be ascertained in advance by experiment or the like. Accordingly, the limit rotational speed Ntmax can be determined as shown in FIG. 7(A) based on the boundary line between the NG region and the OK region and the diameter of water droplets that can actually be generated in the internal combustion engine 10. By this means, the limit rotational speed Ntmax is defined in accordance with the hardware conditions of the internal combustion engine 10.

Figure 7B:
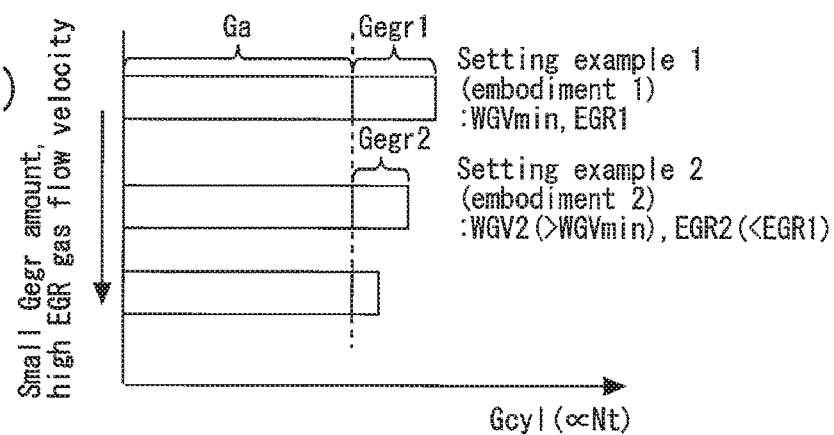

The impeller rotational speed Nt, a supercharging pressure Pim and a total in-cylinder intake gas amount that is drawn into the cylinders Gcyl (=Ga+Gegr) are in a proportional relation with each other. As described above in Embodiment 1, upon the introduction of EGR gas, the impeller rotational speed Nt is increased so as not to cause the intake air amount Ga (engine torque) to change. Therefore, according to the example in Embodiment 1, while giving consideration so as to ensure that the impeller rotational speed Nt does not exceed the limit rotational speed Ntmax, the WGV opening degree is controlled so as to become a lower limit value WGVmin that is less than the WGV opening degree immediately prior to the introduction of EGR gas. An EGR gas amount Gegr1 shown in FIG. 7(B) is an EGR gas amount that can be introduced under the supercharging pressure Pim that is obtained under a situation in which the WGV opening degree is set to the lower limit value WGVmin, without changing the intake air amount Ga before and after opening of the EGR valve 40.

As long as a combination between the WGV opening degree and the EGR valve opening degree under a condition in which the impeller rotational speed Nt is restricted so as not to exceed the limit rotational speed Ntmax is a combination that makes the WGV opening degree greater than the lower limit value WGVmin (sets the WGV opening degree to the open side relative to the lower limit value WGVmin), the combination is not limited to the combination (Setting Example 1) between the lower limit value WGVmin and the EGR valve opening degree EGR1 that is used in Embodiment 1. Setting Example 2 shown in FIG. 7(B) is an example that uses a combination of a WGV opening degree WGV2 and an EGR valve opening degree EGR2. The EGR valve opening degree EGR2 is smaller than the EGR valve opening degree EGR1. The WGV opening degree WGV2 is a WGV opening degree at which the intake air amount Ga is not caused to change between before and after opening of the EGR valve 40 when using the EGR valve opening degree EGR2. According to Setting Example 2, an EGR gas amount Gegr2 that is less than the EGR gas amount Gegr1 of Setting Example 1 is obtained under the WGV opening degree WGV2 that is further on the open side relative to the lower limit value WGVmin. Likewise, a setting in which the EGR gas amount is made less than Gegr2 without changing the intake air amount Ga can also be obtained by setting the WGV opening degree still further to the open side relative to the WGV opening degree WGV2 while also setting the EGR valve opening degree still further to the closed side relative to the EGR valve opening degree EGR2.

According to Setting Example 1, it can be said that the maximum EGR gas amount Gegr1 can be secured under a situation in which the impeller rotational speed Nt is restricted so as not to exceed the limit rotational speed Ntmax. On the other hand, by lowering the EGR valve opening degree, an effect of increasing the flow rate of EGR gas passing through the EGR valve 40 can be expected. If the flow rate of EGR gas passing through the EGR valve 40 increases, it is possible to blow off the condensed water that is attached to the closed EGR valve 40 in a shorter time. That is, the valve detachment time period T1 will be reduced.

Therefore, according to the present embodiment, the EGR valve opening degree when executing the impeller rotational speed control is set to the EGR valve opening degree EGR2 that is less than the EGR valve opening degree EGR1 used in Embodiment 1. Operations of the internal combustion engine 10 when using this EGR valve opening degree setting will now be described referring to FIG. 8(A) to FIG. 8(F) taking a time when the engine is being warmed up as an example.

In the control example illustrated in FIG. 8(A) to FIG. 8(F), accompanying the use of the EGR valve opening degree EGR2, the WGV opening degree WGV2 that is further on the open side relative to the lower limit value WGVmin is used. As a result, the impeller rotational speed Nt is controlled to an impeller rotational speed Nt2 that is lower than the limit rotational speed Ntmax. Since the valve detachment time period T1 is reduced in comparison to the control of Embodiment 1 by using the EGR valve opening degree EGR2, the protection time period T3 for the impeller is shortened. That is, it is possible to shorten the time period in which the impeller rotational speed control is executed and to return to the normal WGV opening degree and EGR valve opening degree control at an earlier timing.

(Specific Processing in Embodiment 2)

Figure 9:
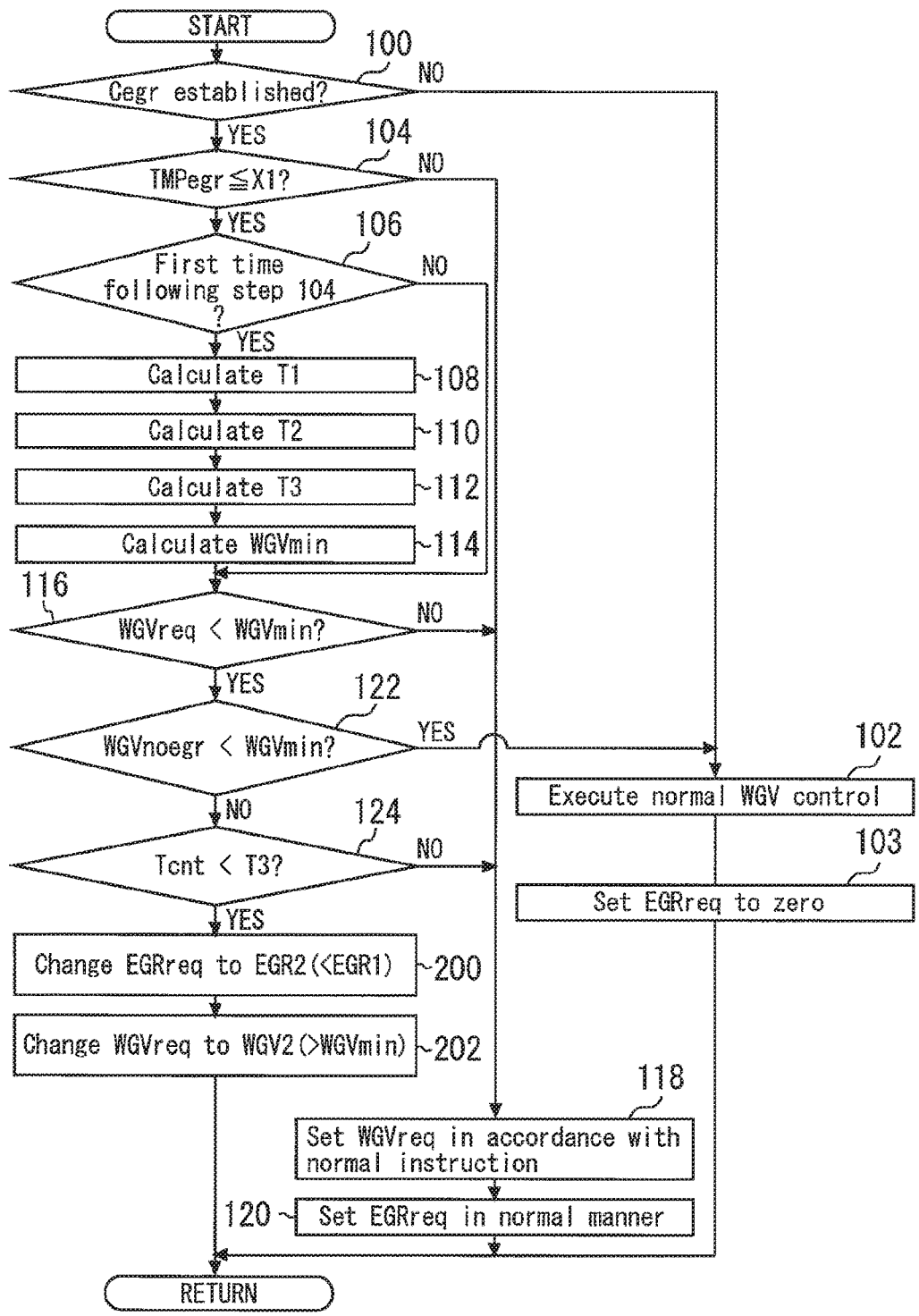
FIG. 9 is a flowchart of a routine executed in Embodiment 2 of the present invention.

FIG. 9 is a flowchart illustrating a routine that is executed by the ECU 50 in Embodiment 2 of the present invention. Note that, in FIG. 9, steps that are the same as steps shown in FIG. 5 according to Embodiment 1 are denoted by the same reference numerals, and a description of those steps is omitted or simplified.

In the routine illustrated in FIG. 9, if it is determined in step 124 that the protection time period T3 has not elapsed, the ECU 50 executes the processing in steps 200 and 202 in that order.

In step 200, the ECU 50 changes the required EGR valve opening degree (EGRreq) from the basic required EGR valve opening degree at a time of starting EGR gas introduction to the EGR valve opening degree EGR2 (see FIG. 8(D)). The EGR valve opening degree EGR2 is set as an appropriate value within an EGR valve opening degree range that is smaller than the EGR valve opening degree EGR1 used in Embodiment 1. The EGR valve opening degree EGR 1 is an EGR valve opening degree at which the EGR gas amount can be maximized under a condition in which the WGV opening degree is not closed more than the lower limit value WGVmin. More specifically, if the EGR valve opening degree is decreased within this EGR valve opening degree range, the EGR valve opening degree will ultimately arrive at a fully closed state. As the EGR valve opening degree approaches the fully closed state, the flow of EGR gas ceases and, as a result, it becomes difficult for water droplets to detach from the EGR valve 40. Accordingly, an EGR valve opening degree EGR2 that is previously set based on the results of experimentation or the like is stored in the ECU 50 as a value that can appropriately increase the flow velocity of gas that passes through the EGR valve in comparison to a case where the EGR valve opening degree is set to the EGR valve opening degree EGR1.

In step 202, the ECU 50 changes the required WGV opening degree (WGVreq) at the time of starting EGR gas introduction to the WGV opening degree WGV2. As described above, the WGV opening degree WGV2 is a value that is set in advance as a WGV opening degree that does not cause the intake air amount Ga to change between before and after opening the EGR valve 40 when using the EGR valve opening degree EGR2.

According to the above described routine illustrated in FIG. 9 also, similarly to the impeller rotational speed control of Embodiment 1 that is described above, the occurrence of an erosion phenomenon at the impeller can be prevented. In addition, according to the present control, in comparison to the control of Embodiment 1, although the EGR gas amount immediately after introduction of EGR gas decreases, ultimately introduction of EGR gas in the amount that was originally required can be performed at an earlier stage by promoting the detachment of water droplets from the EGR valve 40.

Note that, in the above described Embodiment 2, the EGR valve opening degree EGR2 corresponds to "second required EGR valve opening degree" in the sixth aspect of the present invention, and a compressor rotational speed that is obtained in a state in which the WGV opening degree under the exhaust gas flow rate at a time of calculating the WGV opening degree WGV2 is controlled so as to become the WGV opening degree WGV2 corresponds to "first required compressor rotational speed" in the sixth aspect of the present invention.

Embodiment 3

Next, Embodiment 3 of the present invention will be described referring to FIG. 10. The system of the present embodiment can be realized by using the hardware configuration illustrated in FIG. 1, and causing the ECU 50 to execute the routine shown in FIG. 10, described later, instead of the routine shown in FIG. 5 of Embodiment 1. Note that, the control of the present embodiment may be control that is combined with the control (routine illustrated in FIG. 9) of Embodiment 2.

<Characteristic Control in Embodiment 3>

In the present embodiment, it is taken as a premise that whether or not the situation is that in which the EGR valve temperature becomes less than or equal to the predetermined value X1 is determined based on whether or not the intake air temperature is less than or equal to the predetermined value X1 (see step 301 that is described later).

The EGR valve 40 has a heat capacity. Consequently, with the exception of a time of cold starting from a state in which the EGR valve temperature is less than or equal to the predetermined value X1, in a case where the EGR valve 40 was closed in a state in which the EGR valve 40 had been heated by high-temperature EGR gas while open, even if the intake air temperature is equal to or less than the predetermined value X1, it is not the case that the EGR valve temperature immediately becomes less than or equal to the predetermined value X1. In this case, a water droplet attachment time period T4 is supposed for a case in which, after introduction of EGR gas is paused and the EGR valve 40 is closed during engine operation, introduction of EGR gas is resumed while the engine operation is continuing. The water droplet attachment time period T4 is a time period from a time point at which the EGR valve 40 that was heated by high-temperature EGR gas while open is closed, until a time point at which water droplets start to attach to the valve surface due to the closed EGR valve 40 being exposed to low-temperature intake air.

If the water droplet attachment time period T4 has not elapsed, water droplets do not attach to the valve surface even in a situation in which the intake air temperature becomes less than or equal to the predetermined value X1 while the EGR valve 40 is closed. Because of this, if the aforementioned impeller rotational speed control is executed at a time that introduction of EGR gas is resumed under such circumstances in which water droplets do not attach to the valve surface because the water droplet attachment time period T4 has not elapsed, the amount of EGR gas will decrease unnecessarily. Therefore, in the present embodiment a configuration is adopted in which, when the intake air temperature is less than or equal to the predetermined value X1 and a time period in which the EGR introduction is paused has continued for a period of time that is equal to or greater than the water droplet attachment time period T4, it is determined that the situation is one in which condensed water is generated at the EGR valve 40. Further, in a case where introduction of EGR gas is started at or after a time point at which the water droplet attachment time period T4 elapses, the aforementioned impeller rotational speed control is executed.

(Specific Processing in Embodiment 3)

Figure 10:
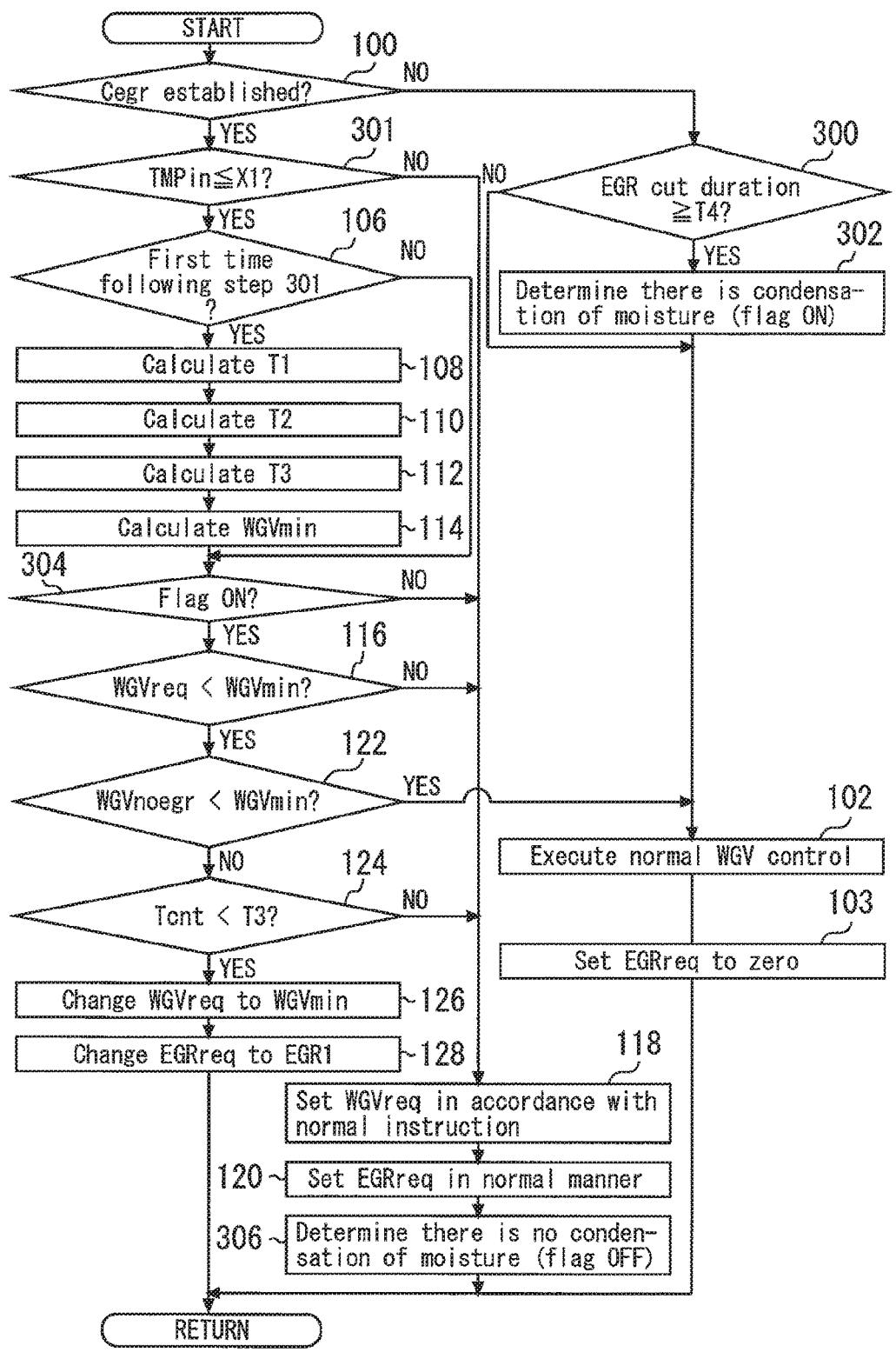
FIG. 10 is a flowchart of a routine executed in Embodiment 3 of the present invention.

FIG. 10 is a flowchart illustrating a routine that is executed by the ECU 50 in Embodiment 3 of the present invention. Note that, in FIG. 10, steps that are the same as steps shown in FIG. 5 according to Embodiment 1 are denoted by the same reference numerals, and a description of those steps is omitted or simplified.

According to the routine shown in FIG. 10, if it is determined in step 100 that the EGR introduction condition (Cegr) is established, the ECU 50 determines whether or not the situation is one in which the EGR valve temperature becomes less than or equal to the predetermined value X1 based on whether or not the intake air temperature (TMPin) is less than or equal to the predetermined value X1 (step 301). On the other hand, if it is determined in step 100 that the EGR introduction condition is not established, the ECU 50 determines Whether or not the time period for which EGR introduction has been paused (EGR cut duration) is equal to or greater than the water droplet attachment time period T4 (step 300). Attachment of water droplets to the EGR valve 40 that is at a certain temperature is determined based on the time period for which the EGR valve 40 is cooled by low-temperature, intake air. Consequently, in this case, the ECU 50 calculates the water droplet attachment time period T4 in accordance with a data table (not illustrated in the drawings) in which the water droplet attachment time period T4 is previously defined so as to be a function of the intake air temperature and the intake air amount. In this data table, the water droplet attachment time period T4 is set so as to become shorter as the intake air temperature becomes lower or as the intake air amount increases. Note that the water droplet attachment time period T4 may be determined in a manner that takes into consideration the EGR valve temperature at the time point at which the EGR valve 40 is closed.

If the result of the present determination is negative, the ECU 50 proceeds to step 102, while if the result of the present determination is affirmative, the ECU 50 proceeds to step 302. In step 302, since the situation is one in which condensed water is generated at the EGR valve 40, the ECU 50 sets a condensation flag to "on".

Further, in the present routine, prior to the processing in step 116, the ECU 50 determines whether or not the condensation flag is set to "on" (step 304). If the ECU 50 determines as a result that the condensation flag is "off", the ECU 50 proceeds to step 118. That is, in this case, since the water droplet attachment time period T4 has not yet elapsed after establishment of the EGR introduction condition, execution of the impeller rotational speed control is prohibited. On the other hand, if the ECU 50 determines that the condensation flag is "on", the ECU 50 proceeds to step 116. The condensation flag is set to "off" after the processing in step 120 is executed (step 306).

According to the routine shown in FIG. 10 that is described above, even in a case where the EGR introduction condition is established and introduction of EGR gas is started under a situation in which the intake air temperature is less than or equal to the predetermined value X1, the impeller rotational speed control is not executed in a case where the water droplet attachment time period T4 has not elapsed. By this means, in a case where a determination as to whether or not the intake air temperature is less than or equal to the predetermined value X1 is utilized as a simple method for estimating the EGR valve temperature, unnecessary restriction of the compressor rotational speed and an unnecessary decrease in the amount of EGR gas can be avoided when starting introduction of EGR gas.

In the above described Embodiment 3, control that takes into consideration transient differences between the intake air temperature and the EGR valve temperature after temporarily stopping the introduction of EGR gas has been described that takes as an object a case in which the introduction of EGR gas is resumed while operation of the engine is continuing after the EGR valve 40 was closed to temporarily stop the introduction of EGR gas. However, this control can also be applied to a case in which operation of the internal combustion engine 10 is stopped after the EGR valve 40 is closed in order to stop the introduction of EGR gas, and the engine is restarted during a period up to a time point at which the EGR valve temperature decreases to a temperature that is less than or equal to the predetermined value X1 while operation of the engine is stopped. That is, while the engine is stopped, although the EGR valve 40 is not exposed to a flow of low-temperature intake air, the EGR valve temperature decreases towards the outdoor air temperature with the passage of time. The EGR valve temperature while the engine is stopped can be estimated based on the engine cooling water temperature or the engine lubricating oil temperature by ascertaining in advance the relation between the EGR valve temperature and the engine cooling water temperature or engine lubricating oil temperature. By using this estimation method, the EGR valve temperature can be estimated at the time point at which engine startup is started. Thus, as described hereunder with reference to FIG. 11, a configuration may be adopted so that the above described impeller rotational speed control is not performed in a case where the estimated value of the EGR valve temperature when starting the engine is higher than the predetermined value X1, even in a case where introduction of EGR gas is started under a situation in which the intake air temperature is less than or equal to the predetermined value X1.

Figure 11:
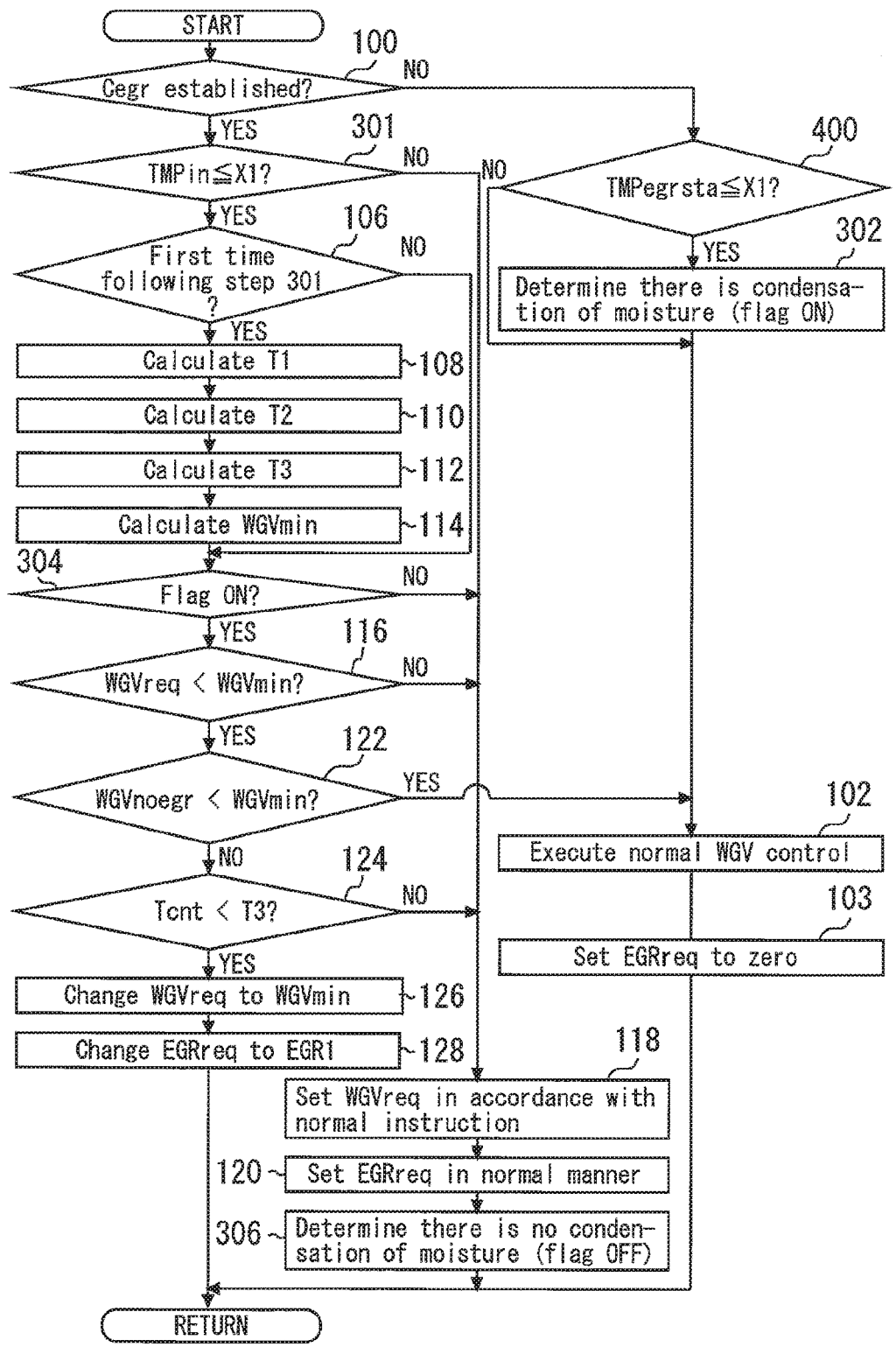
FIG. 11 is a flowchart of a routine executed in a variation of Embodiment 3 of the present invention.

FIG. 11 is a flowchart illustrating a routine that is executed by the ECU 50 in a variation of Embodiment 3 of the present invention. Note that, in FIG. 11, steps that are the same as steps shown in FIG. 10 according to Embodiment 3 are denoted by the same reference numerals, and a description of those steps is omitted or simplified.

According to the routine shown in FIG. 11, if it is determined in step 100 that the EGR introduction condition (Cegr) is not established, the ECU 50 determines whether or not the temperature of the EGR valve 40 at the time of engine startup (TMPegrsta) is less than or equal to the predetermined value X1 (step 400). As described above, the temperature of the EGR valve 40 at the time of engine startup can be estimated based on the engine cooling water temperature that is detected by the water temperature sensor 54 or based on the engine lubricating oil temperature that is detected by the oil temperature sensor 55.

If the result determined in step 400 is that the temperature of the EGR valve 40 at engine startup is less than or equal to the predetermined value X1, the condensation flag is set to "on" (step 302). In contrast, if the result determined in step 400 is that the temperature of the EGR valve 40 at engine startup is higher than the predetermined value X1, the condensation flag is not set to "on". Therefore, if the temperature of the EGR valve 40 at engine startup is higher than the predetermined value X1, even in a case where the results determined in step 100 and step 301 that are performed in that order are affirmative (that is, even in a case where introduction of EGR gas is started under a situation in which the intake air temperature is less than or equal to the predetermined value X1 (dew-point temperature)), the result of the determination in step 304 is negative because the condensation flag is not set to "on". Therefore, restriction of the impeller rotational speed Nt by the processing in step 126 is not performed. Further, in this case, because the result of the determination in step 304 is negative, decreasing of the EGR valve opening degree by the processing in step 128 is also not performed.

It is preferable that the following points are also taken into consideration in the above described control. That is, in a case where the engine cooling water temperature at engine startup is lower than the EGR permissible water temperature, a time difference that corresponds to the amount of time required for the engine cooling water temperature to increase as far as the EGR permissible water temperature arises between a time point at which engine startup commences and a time point at which the EGR introduction condition is established. Because the EGR valve 40 is exposed to the flow of intake air after engine startup, in a case where the above described time difference has arisen, a difference arises between the EGR valve temperature that is estimated based on the engine cooling water temperature or the like and the EGR valve temperature at the time point at which the EGR introduction condition is established. Consequently, a situation can arise in which although the EGR valve temperature at the time point at which startup commences is higher than the predetermined value X1, the EGR valve temperature at the time that the EGR introduction condition is established thereafter becomes less than or equal to the predetermined value X1. On the other hand, a change in the EGR valve temperature after commencing startup can be ascertained based on the relation between the intake air temperature, the intake air amount and the elapsed time period at the time point at which startup commences. Accordingly, in order to accurately estimate the EGR valve temperature at the time that the EGR introduction condition is established, with respect to the EGR valve temperature at the time of engine startup that is estimated based on the engine cooling water temperature and the like, it is preferable to take into consideration an EGR temperature correction amount that is based on the intake air temperature, the intake air amount and the elapsed time period from the time point at which startup commences.

Embodiment 4

Next, Embodiment 4 of the present invention will be described referring to FIG. 12.

The system of the present embodiment can be realized by using the hardware configuration illustrated in FIG. 1, and causing the ECU 50 to execute the routine shown in FIG. 12, described later, instead of the routine shown in FIG. 5 of Embodiment 1.

<Characteristic Control of Embodiment 4>

In the above described Embodiments 1 to 3, in a case where the temperature of the EGR valve 40 at the time of starting introduction of EGR gas when the EGR introduction condition is established is less than or equal to the predetermined value X1 (the dew-point temperature of exhaust gas present in the vicinity of the EGR valve 40 that is in a closed state), a configuration is adopted so that the impeller rotational speed Nt is restricted so as not to exceed the water droplet allowable limit rotational speed Ntmax by restricting the required WGV opening degree to an amount that is less than or equal to the lower limit value WGVmin.

The control of the compressor rotational speed (impeller rotational speed Nt) in the present invention is executed for the purpose of suppressing the occurrence of an erosion phenomenon that is caused by condensed water that is generated on the surface of the EGR valve 40 flowing into the compressor 22a when the EGR valve 40 is opened, and is not necessarily limited to control that is implemented in the above described manner. Specifically, as described below referring to FIG. 12, the present control may be control that is simply implemented in a manner that restricts the impeller rotational speed Nt so as not to exceed the water droplet allowable limit rotational speed Ntmax when introduction of EGR gas is started, without determining whether or not the temperature of the EGR valve 40 is less than or equal to the predetermined value X1. This is because, even when implemented in this manner, the above described purpose can be achieved under a situation in which condensed water is actually being generated at the EGR valve 40.

(Specific Processing of Embodiment 4)

Figure 12:
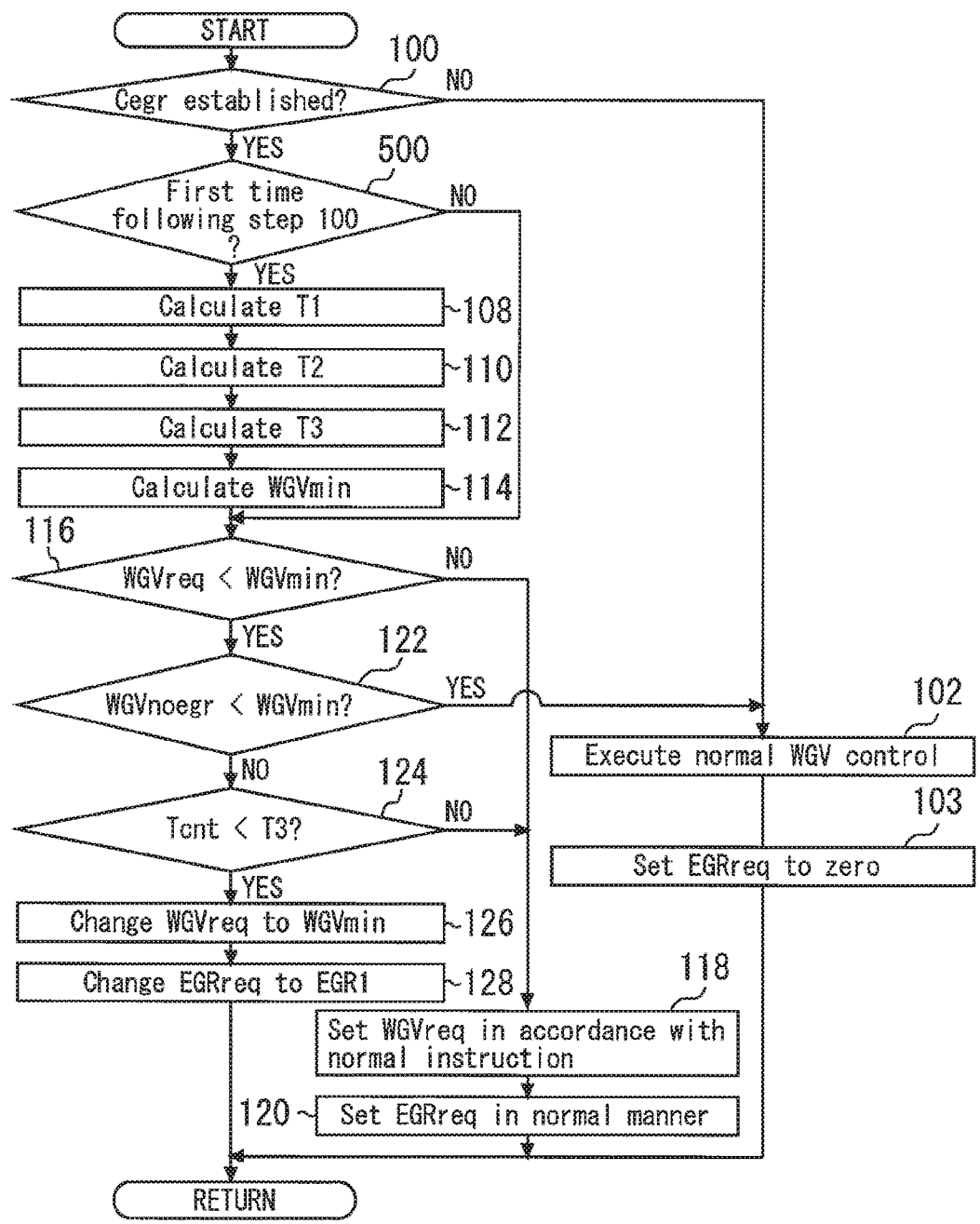
FIG. 12 is a flowchart of a routine executed in Embodiment 4 of the present invention.

FIG. 12 is a flowchart illustrating a routine that is executed by the ECU 50 in Embodiment 4 of the present invention. The present routine is the same as the routine shown in FIG. 5 in Embodiment 1 except that the present routine does not include step 104 in which the ECU 50 determines whether or not the temperature of the EGR valve 40 is less than or equal to the predetermined value X1, and includes step 500 instead of step 106.

The processing in step 500 is processing that determines whether or not the current processing cycle is the first processing cycle after the EGR introduction condition was established. Note that, a configuration may also be adopted in which the processing in steps 200 and 202 in the routine shown in FIG. 9 that is described above is executed instead of the processing in steps 126 and 128 in the present routine. That is, a configuration may also be adopted in which, based on the control of Embodiment 2, control of the impeller rotational speed Nt is performed without determining whether or not the temperature of the EGR valve 40 is less than or equal to the predetermined value X1.

According to the processing of the routine shown in FIG. 12, under a situation in which it was determined in step 100 that the EGR introduction condition (Cegr) was established, if it is determined in step 116 that the required WGV opening degree is less than the lower limit value WGVmin, except for a case in which the impeller rotational speed Nt immediately prior to the current introduction of EGR gas is already higher than the limit rotational speed Ntmax (a case where the result determined in step 122 is affirmative), the impeller rotational speed Nt is restricted so as not to exceed the water droplet allowable limit rotational speed Ntmax (step 126).

Embodiment 5

Next, Embodiment 5 of the present invention will be described referring to FIG. 13.

The system of the present embodiment can be realized by using the hardware configuration illustrated in FIG. 1, and causing the ECU 50 to execute the routine shown in FIG. 13, described later, instead of the routine shown in FIG. 5 of Embodiment 1.

<Characteristic Control of Embodiment 5>

Figure 13:
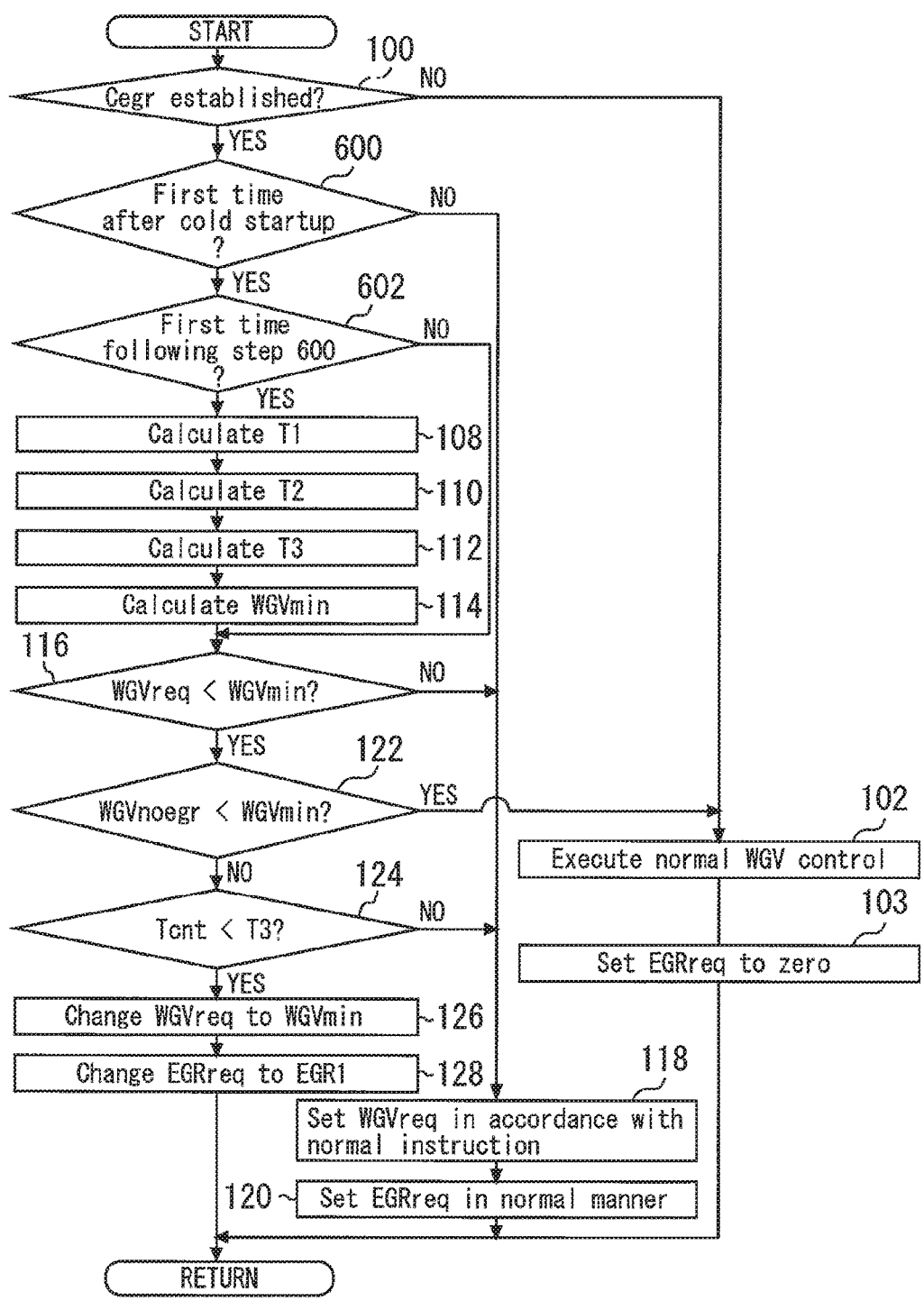
FIG. 13 is a flowchart of a routine executed in Embodiment 5 of the present invention.
Figure 14:
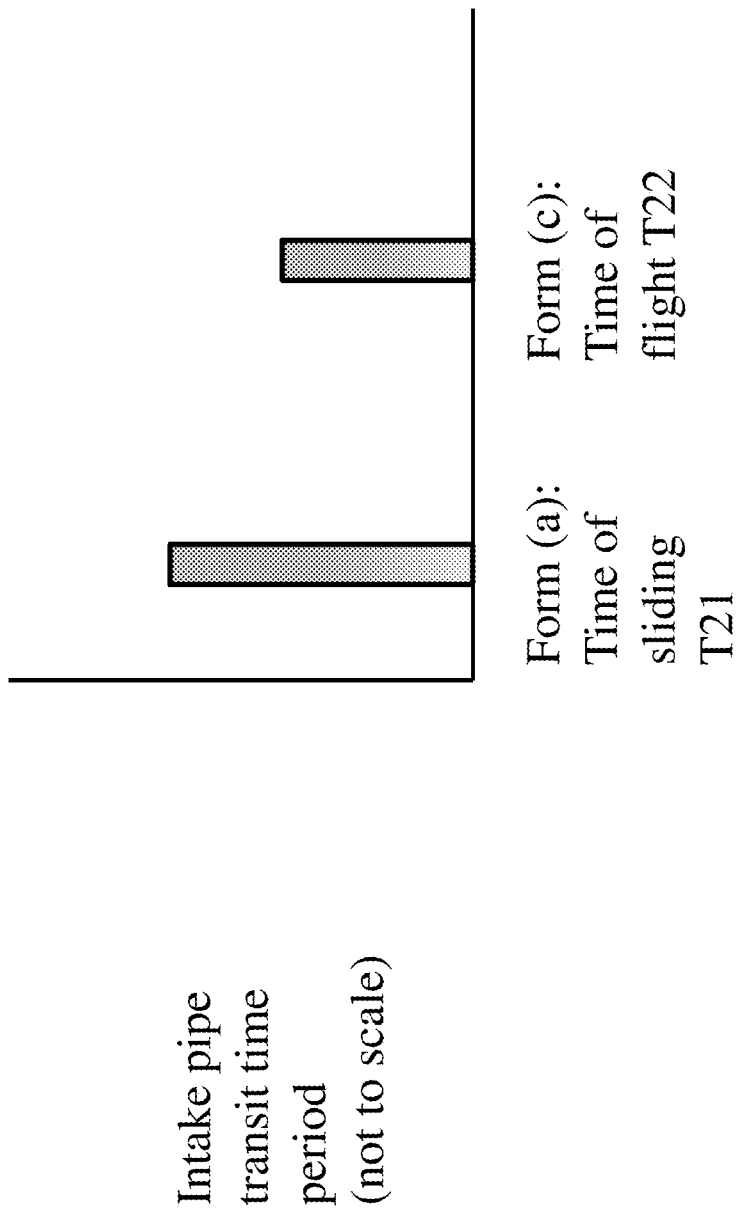
FIG. 14 is a view of relative intake pipe transit times for the time of sliding and the time of flight.
Figure 15:
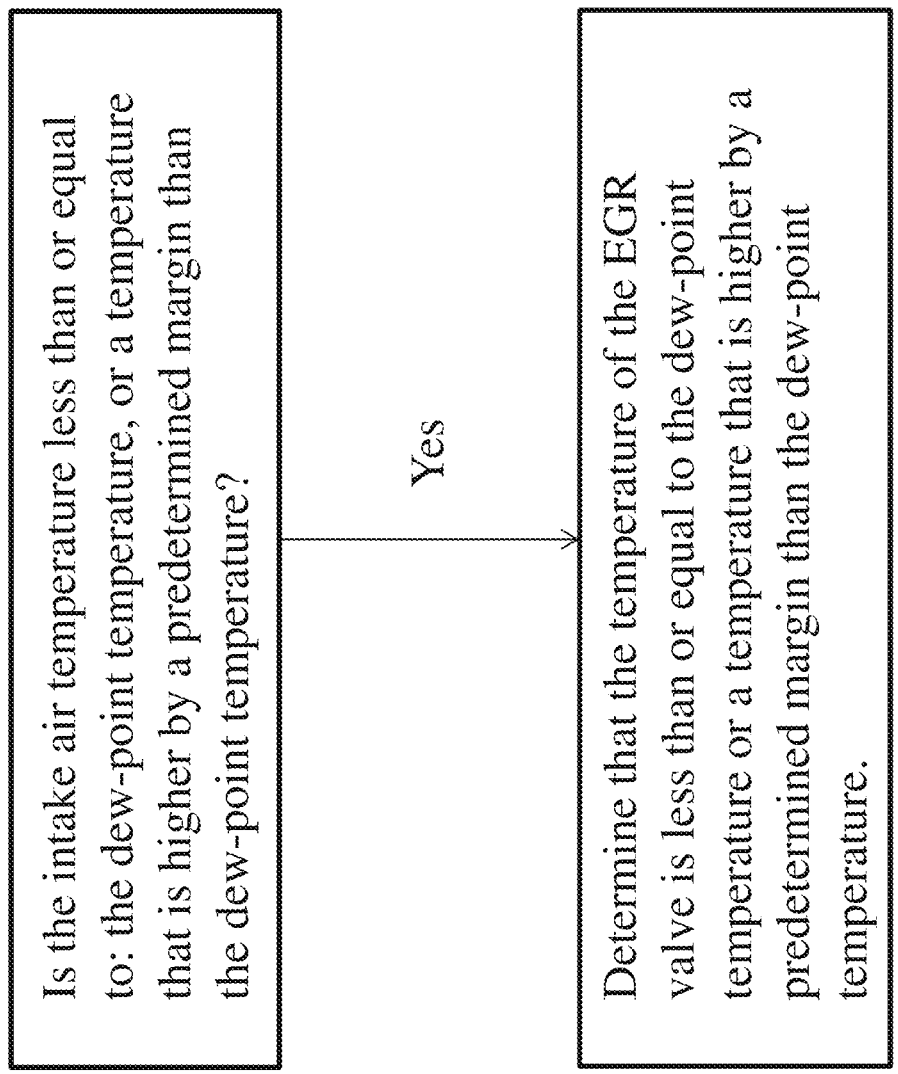
FIG. 15 is a flowchart of a routine executed to determine the temperature of the EGR valve based on the intake air temperature when certain conditions are satisfied.

Control of the compressor rotational speed (impeller rotational speed Nt) according to the present invention may also be control that is implemented in the manner described hereunder with reference to FIG. 13 instead of being implemented in the manner described above in Embodiments 1 to 4. Specifically, similarly to Embodiment 4, the control of the compressor rotational speed of the present embodiment is also performed without determining whether or not the temperature of the EGR valve 40 is less than or equal to the predetermined value X1. In addition, the control of the present embodiment differs from the control of Embodiment 4 in the respect that the impeller rotational speed Nt is restricted so as not to exceed the water droplet allowable limit rotational speed Ntmax, only when introduction of EGR gas is started for the first time after cold starting of the internal combustion engine 10.

At a time of cold starting, there is a high possibility that condensed water is attached to the surface of the EGR valve 40 because the temperature is low. Therefore, by adopting a configuration so as to restrict the impeller rotational speed Nt in a manner that takes, as an object, only a time when introduction of EGR gas is started for the first time after cold starting, the occurrence of an erosion phenomenon at the impeller can be effectively suppressed while reducing as much as possible the occasions when the restriction is implemented.

(Specific Processing in Embodiment 5)

FIG. 13 is a flowchart illustrating a routine that is executed by the ECU 50 in Embodiment 5 of the present invention. The present routine is the same as the routine shown in FIG. 5 in Embodiment 1 except that the present routine does not include step 104 in which the ECU 50 determines whether or not the temperature of the EGR valve 40 is less than or equal to the predetermined value X1, and includes steps 600 and 602 instead of step 106.

The processing in step 600 determines whether or not establishment of the EGR introduction condition (Cegr) in step 100 is the first time the EGR introduction condition was established after cold starting of the internal combustion engine 10. Whether or not starting of the internal combustion engine 10 is cold starting can be determined based on the engine cooling water temperature when starting (for example, based on whether or not the engine cooling water temperature at the time of starting is a temperature that is equivalent to the outdoor air temperature). The processing in step 602 determines whether or not the current processing cycle is the first processing cycle after the result determined in step 600 is affirmative. Note that the processing in steps 200 and 202 in the routine illustrated in FIG. 9 that is described above may be executed instead of the processing in steps 126 and 128 in the present routine. That is, a configuration may also be adopted in which, based on the control of Embodiment 2, control of the impeller rotational speed Nt is performed at a time that introduction of EGR gas is first performed after cold starting, without determining whether or not the temperature of the EGR valve 40 is less than or equal to the predetermined value X1.

According to the processing of the routine shown in FIG. 13, under a situation in which it is determined that the EGR introduction condition was established for the first time after cold starting by the processing in step 100 and 600, if it is determined in step 116 that the required WGV opening degree is less than the lower limit value WGVmin, except for a case in which the impeller rotational speed Nt immediately prior to the current introduction of EGR gas is already higher than the limit rotational speed Ntmax (case where the result determined in step 122 is affirmative), the impeller rotational speed Nt is restricted so as not to exceed the water droplet allowable limit rotational speed Ntmax (step 126).

In Embodiments 1 to 3, which have been described above, the present invention were described by taking as an example the internal combustion engine 10 in which the impeller rotational speed (compressor rotational speed) Nt can be adjusted by adjusting the WGV opening degree. However, control of the compressor rotational speed by "compressor control means" in the present invention is not limited to control that utilizes the WGV 32. That is, for example, if an internal combustion engine is equipped with a turbocharger that includes a variable nozzle that can vary the velocity of exhaust gas that flows into a turbine, instead of control of the WGV opening degree, the control of a compressor rotational speed of the present invention may be performed utilizing control of the variable nozzle that is based on the same concept. Further, for example, if the internal combustion engine includes a compressor of a type that is driven by an electric motor (including a configuration in which the compressor of a turbocharger is assisted by an electric motor), a configuration may be adopted in which the compressor is directly driven by the electric motor to perform the control of the compressor rotational speed of the present invention.

Further, although the control of Embodiment 2 is directed towards a spark-ignition internal combustion engine that controls the engine torque by adjusting the intake air amount Ga, an internal combustion engine that is the object of the control of Embodiments 1 and 3 is not limited to a spark-ignition engine, and may be a compression-ignition engine.

Furthermore, in Embodiment 1 a configuration is adopted that is based on the premise of performing control that increases the compressor rotational speed (impeller rotational speed Nt) to suppress changes in the intake air amount Ga at a time of introducing EGR gas. However, it is not essential for the control of the compressor rotational speed according to the present invention (in particular, in a case where the present invention is applied to a compression-ignition internal combustion engine) to be performed on the premise of increasing the compressor rotational speed accompanying the introduction of EGR gas. That is, for example, under a situation in which a change in the engine torque is suppressed by, for example, an increase in the fuel injection amount at a time of introducing EGR gas in a compression-ignition internal combustion engine, the control may be control that restricts the compressor rotational speed as necessary to serve purely as a countermeasure to the occurrence of condensed water, without adjusting the compressor rotational speed for the purpose of adjusting the engine torque. In addition, with respect to a spark-ignition internal combustion engine also, in a case where the intake air amount Ga (engine torque) is being controlled based on the premise of using control by a method other than the method of controlling the throttle opening degree and WGV opening degree illustrated in FIG. 3(A) and FIG. 3(B), if it is possible to adjust the intake air amount Ga before and after introduction of EGR gas by a method other than adjusting the compressor rotational speed (for example, by adjusting the throttle opening degree, the ignition timing, the intake valve timing, or the exhaust valve timing), it is not always necessary to adjust the compressor rotational speed to adjust the engine torque. This fact similarly applies under a situation in which, due to a reason such as an EGR gas amount that is scheduled for a time of starting introduction of EGR gas being small, at least one part of the amount of a change in the engine torque that is caused by restriction of the compressor rotational speed accompanying introduction of EGR gas is allowed. Accordingly, the forms of the compressor rotational speed control that is an object of the present invention is not limited to control that restricts the amount of increase in the impeller rotational speed Nt so as not to exceed the water droplet allowable limit rotational speed Ntmax in a situation in which the impeller rotational speed Nt should originally be raised in such a manner as indicated by the broken line shown in FIG. 4(F) to adjust the engine torque accompanying introduction of EGR gas. That is, for example, the control may, under a situation in which the compressor rotational speed immediately before the introduction of EGR gas is being controlled so as to be higher than the water droplet allowable limit rotational speed Ntmax, restrict the compressor rotational speed so as to become less than or equal to the water droplet allowable limit rotational speed Ntmax at a time of starting the introduction of EGR gas.

In addition, particularly in the case of a compression-ignition internal combustion engine, if it is possible to perform engine torque adjustment even though EGR gas is introduced in an amount that was originally scheduled, restriction of the compressor rotational speed as a condensed water countermeasure may be performed as necessary without decreasing the EGR valve opening degree.

Further, in the above described Embodiments 1 to 3, the impeller rotational speed Nt during the protection time period T3 is controlled to a constant speed by controlling the WGV opening degree to become the lower limit value WGVmin or controlling the WGV opening degree WGV2 to become a constant value. However, as long as the compressor rotational speed that is being restricted after introduction of EGR gas starts is controlled so as not to exceed the water droplet allowable limit rotational speed, the compressor rotational speed is not necessarily limited to a speed that is controlled at a constant speed.

REFERENCE SIGNS LIST

10 Internal combustion engine
12 Intake passage
14 Exhaust passage
16 Air cleaner
18 Air flow meter
20 Intake air temperature sensor
22 Turbocharger
22a Compressor
22b Turbine
24 Intercooler
26 Throttle valve
28 Exhaust gas purification catalyst
30 Exhaust bypass passage
32 Waste gate valve (WGV)
34 EGR device
36 EGR passage
38 EGR cooler
40 (40a to 40c) EGR valve
50 ECU (Electronic Control Unit)
52 Crank angle sensor
54 Water temperature sensor
56 Fuel injection valve
58 Ignition device
60 Accelerator position sensor

The invention claimed is:

1. A supercharged internal combustion engine, comprising:
   a compressor configured to supercharge intake air;
   an exhaust gas recirculation (EGR) passage connecting an intake passage on an upstream side relative to the compressor with an exhaust passage;
   an EGR valve provided in the EGR passage and regulating an amount of an EGR gas that flows through the EGR passage;
   a sensor configured to detect an engine speed;
   a sensor configured to detect an intake air amount in the intake passage; and
   an electronic control unit (ECU) programmed to determine engine load parameter based on the intake air amount, and control the compressor to operate at a basic required compressor rotational speed that is determined based on the detected engine speed and the determined engine load parameter,
     wherein, when introduction of EGR gas is started and the basic required compressor rotational speed is higher than a predetermined rotational speed, the ECU is programmed to implement a restriction on a compressor rotational speed after the introduction of EGR gas starts so that the compressor rotational speed becomes less than or equal to the predetermined rotational speed.

2. The supercharged internal combustion engine according to claim 1,
   wherein, when the introduction of EGR gas is started for a first time after cold starting of the internal combustion engine and the basic required compressor rotational speed is higher than the predetermined rotational speed, the ECU is programmed to implement the restriction of the compressor rotational speed.

3. The supercharged internal combustion engine according to claim 1,
   wherein, when the introduction of EGR gas is started and a temperature of the EGR valve is less than or equal to a dew-point temperature of exhaust gas that is present in the EGR passage while the EGR valve is closed or a temperature that is higher than the dew-point temperature by a predetermined margin, and
   when the basic required compressor rotational speed is higher than the predetermined rotational speed,
   the ECU is programmed to implement the restriction of the compressor rotational speed.

4. The supercharged internal combustion engine according to claim 3,
   wherein, the ECU is programmed to restrict the compressor rotational speed after the introduction of EGR gas starts until a time period, which is a sum of a time period from a time point at which the EGR valve opens until a time point at which water droplets start to detach from the EGR valve and a time period from the time point at which water droplets start to detach from the EGR valve until a time point at which water droplets finish arriving at an inlet of the compressor, passes.

5. The supercharged internal combustion engine according to claim 3, the supercharged internal combustion engine being a spark-ignition internal combustion engine,
   wherein the ECU is further programmed to control an EGR valve opening degree in accordance with a basic required EGR valve opening degree that is in accordance with an engine operating condition,
   wherein the basic required compressor rotational speed is determined based on the basic required EGR valve opening degree in addition to the detected engine speed and the
   wherein the basic required compressor rotational speed is determined based on the basic required EGR valve opening degree in addition to the detected engine speed and the determined engine load parameter wherein the ECU is programmed to control the EGR valve opening degree at a time of the restriction of the compressor rotational speed performed after the introduction of EGR gas starts, in accordance with a first required EGR valve opening degree that is less than the basic required EGR valve opening degree, and
   wherein the first required EGR valve opening degree is an EGR valve opening degree corresponding to an EGR gas amount that is introduced under a supercharging pressure that is obtained when the compressor rotational speed is set to a compressor rotational speed that is less than or equal to the predetermined rotational speed and the EGR gas amount is introduced while suppressing a change in an intake air amount between before and after opening of the EGR valve.

6. The supercharged internal combustion engine according to claim 5,
further comprising an intake air temperature sensor configured to detect an intake air temperature,
wherein, when the intake air temperature is less than or equal to the dew-point temperature or a temperature that is higher by a predetermined margin than the dew-point temperature, the ECU is programmed to determine that the temperature of the EGR valve is less than or equal to the dew-point temperature or a temperature that is higher by a predetermined margin than the dew-point temperature.

7. The supercharged internal combustion engine according to claim 6,
wherein, when the introduction of EGR gas is started and the intake air temperature is less than or equal to the dew-point temperature or a temperature that is higher by a predetermined margin than the dew-point temperature, and
when an elapsed time period starting from a time at which the EGR valve is closed during engine operation is less than a time period from the time at which the EGR valve is closed until water droplets attach to a surface of the EGR valve,
the ECU is programmed to control the compressor rotational speed after the introduction of EGR gas starts, in accordance with the basic required compressor rotational speed, and
the ECU is programmed to control the EGR valve opening degree after the introduction of EGR gas starts, in accordance with the basic required EGR valve opening degree.

8. The supercharged internal combustion engine according to claim 6,
wherein, when the introduction of EGR gas is started and the intake air temperature is less than or equal to the dew-point temperature or a temperature that is higher by a predetermined margin than the dew-point temperature, and
when the temperature of the EGR valve at engine startup that is estimated based on an engine cooling water temperature or an engine lubricating oil temperature is higher than the dew-point temperature or a temperature that is higher by a predetermined margin than the dew-point temperature,
the ECU is programmed to control the compressor rotational speed after the introduction of EGR gas starts, in accordance with the basic required compressor rotational speed, and
the ECU is programmed to control the EGR valve opening degree after the introduction of EGR gas starts, in accordance with the basic required EGR valve opening degree.

9. The supercharged internal combustion engine according to claim 3, the supercharged internal combustion engine being a spark-ignition internal combustion engine,
wherein the ECU is further programmed to control an EGR valve opening degree in accordance with a basic required EGR valve opening degree that is in accordance with an engine operating condition,
wherein the basic required compressor rotational speed is determined based on the basic required EGR valve opening degree in addition to the detected engine speed and the determined engine load parameter,
wherein the ECU is programmed to control the EGR valve opening degree at a time of the restriction of the compressor rotational speed performed after the introduction of EGR gas starts, in accordance with a second required EGR valve opening degree that is less than an EGR valve opening degree corresponding to an EGR gas amount that is introduced under a supercharging pressure that is obtained when the compressor rotational speed is set to the predetermined rotational speed, and
wherein the ECU is programmed to restrict the compressor rotational speed after the introduction of EGR gas starts, in accordance with a first required compressor rotational speed that suppresses a change in an intake air amount between before and after opening of the EGR valve when using the second required EGR valve opening degree.

10. The supercharged internal combustion engine according to claim 9,
further comprising an intake air temperature sensor configured to detect an intake air temperature,
wherein, when the intake air temperature is less than or equal to the dew-point temperature or a temperature that is higher by a predetermined margin than the dew-point temperature, the ECU is programmed to determine that the temperature of the EGR valve is less than or equal to the dew-point temperature or a temperature that is higher by a predetermined margin than the dew-point temperature.

11. The supercharged internal combustion engine according to claim 10,
wherein, when the introduction of EGR gas is started and the intake air temperature is less than or equal to the dew-point temperature or a temperature that is higher by a predetermined margin than the dew-point temperature, and
when an elapsed time period starting from a time at which the EGR valve is closed during engine operation is less than a time period from the time at which the EGR valve is closed until water droplets attach to a surface of the EGR valve,
the ECU is programmed to control the compressor rotational speed after the introduction of EGR gas starts, in accordance with the basic required compressor rotational speed, and
the ECU is programmed to control the EGR valve opening degree after the introduction of EGR gas starts, in accordance with the basic required EGR valve opening degree.

12. The supercharged internal combustion engine according to claim 10,
wherein, when the introduction of EGR gas is started and the intake air temperature is less than or equal to the dew-point temperature or a temperature that is higher by a predetermined margin than the dew-point temperature, and
when the temperature of the EGR valve at engine startup that is estimated based on an engine cooling water temperature or an engine lubricating oil temperature is higher than the dew-point temperature or a temperature that is higher by a predetermined margin than the dew-point temperature,
the ECU is programmed to control the compressor rotational speed after the introduction of EGR gas starts, in accordance with the basic required compressor rotational speed, and
the ECU is programmed to control the EGR valve opening degree after the introduction of EGR gas starts, in accordance with the basic required EGR valve opening degree.

13. The supercharged internal combustion engine according to claim 3,
further comprising an intake air temperature sensor configured to detect an intake air temperature,
wherein, when the intake air temperature is less than or equal to the dew-point temperature or a temperature that is higher by a predetermined margin than the dew-point temperature, the ECU is programmed to determine that the temperature of the EGR valve is less than or equal to the dew-point temperature or a temperature that is higher by a predetermined margin than the dew-point temperature.

14. The supercharged internal combustion engine according to claim 13,
wherein, even when the introduction of EGR gas is started and the intake air temperature is less than or equal to the dew-point temperature or a temperature that is higher by a predetermined margin than the dew-point temperature, in a state in which an elapsed time period from a time at which the EGR valve is closed during engine operation is less than a time period from the time at which the EGR valve is closed until water droplets attach to a surface of the EGR valve, the ECU is programmed to control the compressor rotational speed after the introduction of EGR gas starts, in accordance with the basic required compressor rotational speed.

15. The supercharged internal combustion engine according to claim 13,
wherein, even when the introduction of EGR gas is started and the intake air temperature is less than or equal to the dew-point temperature or a temperature that is higher by a predetermined margin than the dew-point temperature, in a state in which the temperature of the EGR valve at engine startup that is estimated based on an engine cooling water temperature or an engine lubricating oil temperature is higher than the dew-point temperature or a temperature that is higher by a predetermined margin than the dew-point temperature, the ECU is programmed to control the compressor rotational speed after the introduction of EGR gas starts, in accordance with the basic required compressor rotational speed.

* * * * *